United States Patent
Nagy et al.

(10) Patent No.: US 12,190,226 B2
(45) Date of Patent: Jan. 7, 2025

(54) METHOD FOR ACCELERATING OPERATIONS AND ACCELERATOR APPARATUS

(71) Applicant: AImotive Kft., Budapest (HU)

(72) Inventors: Gyula Nagy, Kunszentmárton (HU); Márton Fehér, Budapest (HU); István Herman Weimann, Bogád (HU)

(73) Assignee: AImotive Kft., Budapest (HU)

( * ) Notice: Subject to any disclaimer, the term of this patent is extended or adjusted under 35 U.S.C. 154(b) by 1001 days.

(21) Appl. No.: 17/048,048

(22) PCT Filed: Apr. 9, 2019

(86) PCT No.: PCT/EP2019/058868
§ 371 (c)(1),
(2) Date: Oct. 15, 2020

(87) PCT Pub. No.: WO2019/201656
PCT Pub. Date: Oct. 24, 2019

(65) Prior Publication Data
US 2021/0241082 A1    Aug. 5, 2021

(30) Foreign Application Priority Data
Apr. 19, 2018 (EP) .................................... 18168282

(51) Int. Cl.
*G06N 3/063*     (2023.01)
*G06F 12/02*     (2006.01)
(Continued)

(52) U.S. Cl.
CPC ......... *G06N 3/063* (2013.01); *G06F 12/0207* (2013.01); *G06F 12/0813* (2013.01); *G06F 12/0846* (2013.01); *G06F 2212/1016* (2013.01)

(58) Field of Classification Search
CPC ...................................................... G06N 3/063
(Continued)

(56) References Cited

U.S. PATENT DOCUMENTS 6,928,196 B1    8/2005    Bradley et al.
8,369,595 B1 *   2/2013    Derakhshani .......... G06V 40/18
                                                         382/128
(Continued)

FOREIGN PATENT DOCUMENTS

CA          3153473 A1 *   4/2021           B64C 39/024
CN        107437110 A     12/2017
(Continued)

OTHER PUBLICATIONS

Guo, K. et al., "A Survey of FPGA-Based Neural Network Inference Accelerator", ACM Transactions on Reconfigurable Technology and Systems, vol. 9, No. 4, Article 11. Publication date: Dec. 2017, 26 pgs.

(Continued)

*Primary Examiner* — Ruay Ho
(74) *Attorney, Agent, or Firm* — Seed IP Law Group LLP

(57) ABSTRACT

A method for accessing and processing data by an accelerator apparatus includes retrieving at least a part of input data to be processed by the accelerator apparatus, segmenting the input data into a plurality of adjacent input tiles, the input tiles having a pre-determined size, storing at least one of the plurality of adjacent input tiles in a data buffer of the accelerator apparatus, accessing data elements of the at least one of the plurality of adjacent input tiles stored in the data buffer by positioning an input window over the data elements stored in the data buffer, to generate a plurality of input areas, wherein the input window is adjustable according to a set of parameters, and sequentially processing at least one of the plurality of input areas to at least partially (Continued)

process the at least one of the plurality of adjacent input tiles by the accelerator apparatus.

14 Claims, 14 Drawing Sheets

(51) Int. Cl.
*G06F 12/0813* (2016.01)
*G06F 12/0846* (2016.01)

(58) Field of Classification Search
USPC .............................. 706/33; 711/154; 382/128
See application file for complete search history.

(56) References Cited

U.S. PATENT DOCUMENTS

| | | | |
|---|---|---|---|
| 9,665,799 | B1 | 5/2017 | Munteanu et al. |
| 10,354,733 | B1 | 7/2019 | Zejda et al. |
| 2012/0041914 | A1 | 2/2012 | Tirunagari |
| 2016/0092112 | A1* | 3/2016 | Akgun ................... H03M 7/30 711/154 |
| 2017/0277658 | A1 | 9/2017 | Pratas et al. |
| 2017/0278289 | A1 | 9/2017 | Marino et al. |
| 2017/0323196 | A1 | 11/2017 | Gibson et al. |
| 2018/0005074 | A1* | 1/2018 | Shacham ............... G06N 3/063 |
| 2018/0046900 | A1 | 2/2018 | Dally et al. |
| 2018/0046903 | A1* | 2/2018 | Yao ....................... G06N 3/048 |
| 2018/0046913 | A1 | 2/2018 | Yu et al. |
| 2018/0189639 | A1 | 7/2018 | Henry et al. |
| 2018/0307980 | A1 | 10/2018 | Barik et al. |
| 2019/0114499 | A1* | 4/2019 | Delaye .................. G06V 10/95 |
| 2019/0205741 | A1* | 7/2019 | Gupta ................... G06F 17/13 |
| 2019/0295228 | A1* | 9/2019 | Liu ........................ G06T 5/60 |

FOREIGN PATENT DOCUMENTS

| | | |
|---|---|---|
| CN | 107766820 A | 3/2018 |
| EP | 3 035 249 A1 | 6/2016 |
| JP | 11-85969 A | 3/1999 |
| JP | 2011-141823 A | 7/2011 |
| JP | 2017-151604 A | 8/2017 |
| KR | 10-2017-0099848 A | 9/2017 |
| WO | 2017/003887 A1 | 1/2017 |
| WO | 2017/129325 A1 | 8/2017 |
| WO | 2019/201657 A1 | 10/2019 |

OTHER PUBLICATIONS

International Search Report for Application No. PCT/EP2019/058868 dated Apr. 26, 2019, 15 pgs.

Bellas, N. et al., "FPGA implementation of a license plate recognition SoC using automatically generated streaming accelerators", Proceedings 20$^{th}$ International Parallel and Distributed Processing Symposium Apr. 25, 2006, 8 pgs.

Farabet, C. et al.: "NeuFlow: A Runtime Reconfigurable Data Flow Processor for Vision", Embedded Computer Vision Workshop, 2011, 8 pgs.

Peemen, M. C. J. et al., "Memory-Centric Accelerator Design for Convolutional Neural Networks", Proceedings of the 2013 IEEE 31th International Conference on Computer Decision (ICCD), Oct. 6-9, 2013, 8 pgs.

Windh, S. et al, High-Level Language Tools for Reconfigurable Computing, Proceedings of the IEEE, vol. 103, No. 3, Mar. 2, 2015, 19 pgs.

Song, L. et al., "C-Brain: A Deep Learning Accelerator that Tames the Diversity of CNNs through Adaptive Data-level Parallelization", Proceedings of the 53$^{rd}$ Annual Design, Automation Conference, Jun. 5, 2016, 6 pgs.

Sharma, H. et al., "From High-Level Deep Neural Models to FPGAs", 2016 49th Annual IEEE/ACM International Symposium on Microarchitecture (MICRO), IEEE, Oct. 15, 2016, pp. 1-12, XP033022463.

International Search Report for Application No. PCT/EP2019/058871 mailing date Apr. 26, 2019, 15 pgs.

Chakradhar, S. et al.: "A Dynamically Configurable Coprocessor for Convolutional Neural Networks", ISCA, 2010.

* cited by examiner

METHOD FOR ACCELERATING OPERATIONS AND ACCELERATOR APPARATUS

BACKGROUND

Technical Field

The present disclosure relates to a method for accessing and processing data by an accelerator apparatus, an accelerator apparatus and a system. In particular, the present disclosure may relate to a method that operates on adjacent input tiles using an adjustable input window.

Description of the Related Art

Due to recent developments in computing technology, operation of a majority of devices, machines, or infrastructures completely relies on computer-based processing of various input data and/or computer-based evaluation of processing states in order to generate information suitable for controlling the device, machine or infrastructure. Often, this processing and corresponding decision making requires a huge amount of complex computational tasks or operations, which are, however, often of a similar type. Even though the tasks or operations may be performed by a general-purpose processing unit, such as a CPU or cores of a processing device, dedicated hardware for accelerating such tasks or operations has been variously proposed. This dedicated hardware is typically referred to as an accelerator.

For example, various types of math co-processors have been proposed to accelerate mathematical operations, such as operations on floating point numbers and the like. As another example of an accelerator, video or graphics accelerators have been proposed to accelerate processing and rendering of graphics or video objects. Accelerators typically include dedicated hardware specialized on a required task or operation and respective data formats.

In the area of image processing, computer vision and artificial intelligence, accelerators for convolution operations have been proposed. Convolution operations are required in a large number of artificial intelligence approaches to analyze and classify input data to enable decision processes. Since this type of processing is typically performed locally on respective device responsive to captured sensor data, real-time processing of convolution operations has become a key issue, for example, in face recognition, traffic sign detection, and other tasks related to surveillance, security applications, autonomous driving, and the like. Convolutional neural networks (CNNs) are one example of a technique applied in computer vision and artificial intelligence that uses convolution operations. CNNs combine feature extraction and classification in a single flexible model that can adapt to various scenarios by updating processing parameters.

Several CNN accelerators have been proposed, for example, by S. Chakradhar et al.: "A Dynamically Configurable Coprocessor for Convolutional Neural Networks," ISCA, 2010, and C. Farabet et al.: "NeuFlow: A Runtime Reconfigurable Data Flow Processor for Vision," Embedded Computer Vision Workshop, 2011. These CNN accelerators map operation of the CNN to dedicated hardware. However, in most approaches difficulties arise with arbitration and routing to share inputs and connect outputs of the CNN to other resources. In various application scenarios, the processing efficiency of the accelerator may be strongly reduced due to excessive data transfer and limited bandwidth, which may degrade the efficiency of the accelerator. M. Peemen et al.: "Memory-centric Accelerator Design for Convolutional Neural Networks," ICCD, 2013, discloses a memory-centric accelerator design for convolutional neural networks with a memory sub-system that addresses bandwidth issues by exploiting data reuse and memory access patterns. The accelerator is coupled to an external memory via Fast Simplex Link connections that are used by a host processor to stream data into and out of the accelerator.

Further to bandwidth issues, known accelerators are limited by a particular size and arrangement of the input data. U.S. Pat. No. 9,665,799 discloses a CNN that calculates convolution for a weight kernel with underlying data per cycle. Yet, the computational resources may not be fully exploited if a weight kernel of another size is used and computational efficiency may drop if the input data are subsampled. Another layout of an accelerator is disclosed in WO 2017/003887 A1. This setup may require storage of redundant input data due to weight kernel overlap.

Accordingly, in at least one aspect, the present disclosure defines an approach for accessing and processing of data, such as by applying convolution operations, by an accelerator apparatus, which may be flexibly adapted to various scenarios, which efficiently exploits available resources, and handles bandwidth issues with regard to exchange of input and output data processed by the accelerator apparatus.

BRIEF SUMMARY

In one aspect of the present disclosure, a method for accessing and processing data by an accelerator apparatus is defined. The method comprises retrieving at least a part of input data to be processed by the accelerator apparatus, segmenting the input data into a plurality of adjacent input tiles, the input tiles having a pre-determined size, storing at least one of the plurality of adjacent input tiles in a data buffer of the accelerator apparatus, accessing data elements of the at least one of the plurality of adjacent input tiles stored in the data buffer by positioning an input window over the data elements stored in the data buffer, to generate a plurality of input areas, wherein the input window is adjustable according to a set of parameters, and sequentially processing at least one of the plurality of input areas to at least partially process the at least one of the plurality of adjacent input tiles by the accelerator apparatus.

The method may be implemented as hardware, software, or a combination of both, such as hardware units configured to perform one or more of the method steps, in an accelerator apparatus with a plurality of processing modules, each configured to process the input data, a control module configured to control processing of each of the plurality of processing modules, and/or a cache module configured to store at least a portion of data processed by at least one of the plurality of processing modules. Each processing module may include a processing core configured to process the input data by performing an operation using a plurality of processing elements, an input control unit configured to retrieve the input data, for example, external data via an interface and/or data stored in the cache module, and to provide the retrieved input data to the processing core. The processing core may include the data buffer storing the input tiles. Each processing module may further include an output control unit configured to provide data processed by the processing core to the interface and the cache module.

The method improves access to and processing of data in the accelerator apparatus by defining a structure for retrieval of the input data and operating on individual input tiles using an adjustable input window. This simplifies a structured retrieval of input data stored in the data buffer and handling of the retrieved input data by the accelerator apparatus, such that the hardware implementing processing elements may be simplified to processing of consecutive input areas.

In one embodiment, the method further comprises sequentially storing another one of the plurality of adjacent input tiles in the data buffer, and accessing data of the other one of the plurality of adjacent input tiles using the input window.

According to one embodiment, the set of parameters includes a stride value and a dilation value. It is to be understood that the stride value and the dilation value represent numerical values that are parameters configuring the input window to generate the input areas.

In a preferred embodiment, the dilation value defines a distance between two successive positions of the input window.

In yet another embodiment, the method further comprises determining a processing mode of the accelerator apparatus. Preferably, in a first processing mode, the stride value defines a spacing between data elements sampled by the input window. According to another preferred embodiment, in a second processing mode, the stride value defines a number of data elements generated by a single data element of the input window. The data elements may be generated in one or more dimensions, two dimensions, three dimensions, or more than three dimensions. For example, the data elements may be generated in two dimensions including a horizontal dimension and a vertical dimension. The number of data elements generated by a single data element of the input window may depend on the number of dimensions and/or stride values (or stride value components), which may be defined for each dimension. For example, in two dimensions, a horizontal stride value (component) $s_x$ and a vertical stride value (component) $s_y$ may be defined and the number of data elements generated by the single data element of the input window may be $s_x * s_y$. It is to be understood that any parameter of the set of parameters, such as the stride value and/or the dilation value, may be defined as having one or more components for one or more dimensions that may refer to dimensions of input and/or output data. Respective components of the parameters may be associated with individual dimensions and/or with multiple dimensions, such that, for example, the same stride value (component) may be applied to at least some or all dimensions. For example, for $s_x = s_y$, the same stride value may be applied to each of two dimensions of output data.

In one embodiment, the set of parameters further includes a mapping to a coefficient matrix stored in a coefficient buffer, wherein an input area is processed by applying at least one element of the coefficient matrix to the input area according to the mapping.

According to one embodiment, the method further comprises retrieving the at least one element of the coefficient matrix in parallel with generating the input area, and applying the at least one element of the coefficient matrix on the input area using at least one processing element. The at least one processing element may be one of the processing elements of a processing core of a processing module of the accelerator apparatus. However, it is to be understood that the processing elements may also be structured differently in the accelerator apparatus. For example, the accelerator apparatus and/or the processing core may comprise the plurality of processing elements.

In another embodiment, the at least one processing element implements an element-wise product.

According to another embodiment, the input window is positioned over the data elements stored in the data buffer according to the mapping and/or the processing mode.

In yet another embodiment, accessing the data elements via the input window is hard-wired in a circuitry implementing the data buffer.

In a further embodiment, the data buffer is a two-dimensional data buffer and each of the plurality of input areas represents a two-dimensional area.

Preferably, the accelerator apparatus implements a convolution operation on the input data.

In a preferred embodiment, the input data include sensor data. Preferably, the sensor data may comprise one or more of computer vision data, image data, and/or monitoring data of processing states of one or more devices.

According to a further aspect of the present disclosure, one or more machine readable media are defined storing instructions thereon that, when executed on a computing device or an (accelerator) apparatus, configure the computing device or apparatus to execute a method according to any one embodiment of the present disclosure.

According to a further aspect of the present disclosure, an accelerator apparatus for processing input data is defined, comprising an interface configured to couple the apparatus to an interconnect, and at least one processing module configured to process input data, wherein the accelerator apparatus is configured to retrieve at least some of the input data via the interface and process the input data using the at least one processing module according to a method of one or more embodiments of the present disclosure. It is to be understood that the accelerator apparatus may include any features of an (accelerator) apparatus or system according to one or more embodiments of this disclosure in any combination.

According to yet another aspect of the present disclosure, an (accelerator) apparatus is defined, which comprises an interface configured to couple the apparatus to an interconnect, a plurality of processing modules, each processing module configured to process data, a control module configured to control processing of each of the plurality of processing modules, and a cache module configured to store at least a portion of data processed by at least one of the plurality of processing modules, wherein each processing module further includes a processing core configured to process data by performing an operation using a plurality of processing elements, an input control unit configured to retrieve data via the interface and data stored in the cache module and to provide the retrieved data to the processing core, and an output control unit configured to provide data processed by the processing core to the interface and the cache module.

The apparatus may be plugged into a computing system using the interface, which may receive input data for processing by the plurality of processing modules and provide results of the processing of the apparatus. The apparatus further includes a cache module that stores parts of the result data to enable the plurality of processing modules to directly access any intermediate data or results via the cache module. This may reduce any transmission of input data to an initial setup and exchange of (final) results. Even if data should be required during processing, an excessive communication of intermediate data via the interface may be reduced.

The cache module may be provided together with the plurality of processing modules on a same die, circuitry or within the same package, and may be wired or otherwise coupled to the plurality of processing modules to enable a direct exchange of output data as input data for a next computation cycle via the cache module. The cache module may be configured as a memory to store and/or buffer at least parts of the result data of one or more of the processing modules, which may further serve as input for processing of (a different or the same) one or more of the processing modules. The cache module may be a memory with multiple write and read ports, which may be connected to the processing modules, in order to provide a low-latency on-chip memory for the respective processing modules.

The apparatus comprises a plurality of processing modules, wherein each processing module may perform a required operation on the input data, which may be either retrieved via the interface or directly from the cache module. This enables a flexible configuration of the apparatus for various tasks or operations.

Each processing module includes a processing core with a plurality of processing elements that may process multiple data values of the input data to generate corresponding (intermediate) results. Each processing module further includes an input control unit that controls whether the input data to be processed by the processing core is retrieved via the interface or from the cache module. Provision of the results of the convolution operation is further controlled by the output control unit, which controls whether the output data is either provided via the interface (to an external storage) or stored in the cache module as intermediate data that is further used as a subsequent input by at least one of the plurality of processing modules. This enables a flexible configuration of the apparatus to accelerate operations for various tasks and operations, which efficiently exploits the available resources and decreases the amount of data communicated via the interface to an external host. Accordingly, each processing element may access the cache module on individual write and read interfaces to gain simultaneous access to the cache module.

Preferably, the input data and/or output data may include layer data of a neural network. In one embodiment, the input data and/or output data may include image data and data elements of the input data and/or output data may be picture elements (pixels) of respective images.

In a preferred embodiment, the operation may be a convolution operation. Accordingly, throughout this disclosure, the processing module may be denoted as a convolution module, and the processing core may be denoted as a convolution core that may be configured to process data by performing the convolution operation using the plurality of processing elements. However, it is to be understood that the present disclosure is not limited to accelerating convolution operations only. In other embodiments, the processing cores may, for example, perform relational operations on the input data. The skilled person could think of various other examples of operations.

In a preferred embodiment, the control module is configured to retrieve configuration data via the interface and to setup at least one processing module of the plurality of processing modules based on the configuration data. The configuration data may describe/include characteristics of the input data, including dimensionality, data types, and the like. The configuration data may further describe/include parameters of the operation, such as the convolution operation, which may identify the data of the input data to be processed, a number of iterations and the like. The configuration data may further describe a utilization of the cache module to store intermediate data, and/or characteristics of the resulting output data, such as size, data type, and the like, in any combination. The configuration data may be transmitted by a host, which may setup the apparatus for performing the desired operations. After setup, the apparatus may receive initial input data via the interface, wherein the control module may trigger the plurality of processing modules to start processing of the initial and any subsequent input data.

In a preferred embodiment, the control module is further configured to schedule commands between the plurality of processing modules. The commands may initiate processing of the individual processing modules responsive to availability of input data and may further configure the individual processing modules to store and/or retrieve the output data and/or the input data either via the interface and/or to/from the cache module.

In one embodiment, the commands are scheduled responsive to a plurality of states received from one or more of the input control units and the output control units of the plurality of processing modules. The states may be signaled as status flags or via similar techniques. The control module may be connected to each input control unit and output control unit of the plurality of processing modules to receive the signals that may indicate one or more of an indication that reading of the input data has completed, that the results are ready, that provision of results is finished, and further states of processing that enable command arbitration between the plurality of processing modules. The commands may be defined using any kind of programming logic or programming language. The commands may be defined as binary instructions defined using a binary word, including a plurality of bits, such as 64, 128, 256, 512, 1024 bits or more bits, preferably of a power of two, which may concatenate multiple parameters into a single word. However, it is to be understood that more or less bits may be used in order to define a word. For example, a binary instruction may include a word of 512 bits. The parameters of processing by the respective processing modules may include one or more of layer operation type and parameters, such as area size, filter size, stride, dilation, convolution/deconvolution/pooling, scheduling dependency lists and the like; input plane location, such as in an external memory or in the cache module, base address, plane offset, and the like; and output plane location, such as in an external memory or in the cache module, base address, plane offset, and the like, in any combination.

In yet another embodiment, the control module is configured to control at least one output control unit of at least one processing module and one or more input control units of one or more processing modules to feed back data processed by the at least one processing module to the one or more processing modules via the cache module. The at least one processing module may provide results that may be required by the one or more processing modules in a subsequent (convolution or any other) operation. The control module may configure the at least one output control unit of the at least one processing module to store any results in the cache module and the one or more input control units of the one or more processing modules to read input data from the cache module. As soon as the at least one processing core of the at least one processing module completes the convolution (or any other) operation, the at least one output control unit of the at least one processing module may store the results in the cache module and may signal to the control module (via respective status flags) that results are available. The control module may thereafter trigger operation of the one or more input control units of the one or more processing modules such that the one or more input control units directly retrieve the result data from the cache module as input data for the subsequent (convolution or any other)

operation performed by the respective processing cores. This enables an iterative processing of operations without requiring any exchange of input data or results via the interface, effectively resulting in reduced use of the interface. Since the cache module is shared by the plurality of processing modules, each of the plurality of processing modules may re-use the cached results. The cache module may be an on-chip memory, which may have multiple ports on read and write sides. This may result in a higher bandwidth of the on-chip cache module when compared with the interface. The on-chip cache module may effectively reduce power consumption since it does not require power-extensive boundary I/O interfaces.

In yet another embodiment, each processing module further includes a coefficient control unit configured to retrieve coefficient data via the interface. The control module may be configured to further schedule commands responsive to a plurality of states received from one or more of the coefficient control units of the plurality of processing modules. For example, the coefficient control unit may signal to the control module that coefficient data has been read. The coefficient data may be provided to the processing core, such that the processing core may perform the (convolution or any other) operation based on the input data and the coefficient data.

In a preferred embodiment, at least one (or each) processing core further includes a data buffer, and a processing control unit configured to control the plurality of processing elements to process input data stored in the data buffer. It is to be understood that if the operation implemented by the processing elements is a convolution operation, the processing control unit may also be referred to as a convolution control unit throughout this disclosure. The data buffer may be controlled by the input control unit and may store the data retrieved by the input control unit. The processing control unit may drive retrieval of the input data from the data buffer. Subsequently, the processing control unit may initiate processing of the (convolution or any other) operation by the plurality of processing elements, which may each calculate a fraction of the operation using respective input data.

In a preferred embodiment, at least one (or each) processing core further includes a coefficient buffer, wherein the processing control unit is configured to control the plurality of processing elements to process input data stored in the data buffer using coefficient data stored in the coefficient buffer. The coefficient buffer may be controlled by the coefficient control unit and may store the retrieved coefficient data. The processing control unit may drive retrieval of the coefficient data and the input data from the coefficient buffer and data buffer, respectively, such that the coefficient data and the input data may be simultaneously read. Subsequently, the processing control unit may initiate processing of the (convolution or any other) operation by the plurality of processing elements, which may each calculate a fraction of the operation using respective input data and coefficient data.

According to a preferred embodiment, the coefficient data include weight coefficients and bias values applied to at least some of the input data.

In one embodiment, the data buffer is a two-dimensional data buffer configured to store data, such as at least a part of the input data, as a two-dimensional array. Accordingly, the stored data may be accessed by using two indices, which may simplify selection and retrieval of input data elements for processing by the individual processing elements. Since in most scenarios, the plurality of processing elements will operate on input data in a consecutive region of input data, the data buffer may be loaded with the consecutive region of the input data and individual processing elements may be provided with the respective data elements of the input data according to their indices.

In a preferred embodiment, data in the data buffer may be accessed using an input window as described in one or more embodiments of the present disclosure.

In at least one embodiment, at least one processing element of the processing core is configured to perform a multiply-accumulate operation. The multiply-accumulate operation may be implemented using a multiply-accumulate circuit (MAC). Each processing element may be provided as dedicated hardware or as a programmable hardware configured to perform the operation, such as the multiply-accumulate operation or a relational operation. The processing modules or at least parts thereof may be implemented as customized hardware, including ASICs, or as reconfigurable hardware, including FPGAs. It is to be understood that all processing elements may be implemented in hardware in the same or similar manner and that each processing element may implement the operation. However, the processing elements may also be implemented differently. For example, the plurality of processing elements in each processing module may implement a different operation or may be implemented differently for the same operation, in any combination.

In yet another embodiment, the at least one processing element of the processing core further comprises a result store configured to buffer results of the (multiply-accumulate or any other) operation. The result store may store partial results and may be controlled by the processing control unit to buffer partial results for the same output at respective positions that are influenced by the operation performed by the individual processing elements. The processing element providing the multiply-accumulate operation may be implemented as a MAC unit with memory implementing the result store, and a multiply-add (MADD) circuit with a multiplier, adder and bias multiplexer. In an FPGA implementation, the MADD circuit could fully or partially utilize one or more dedicated DSP blocks. Additionally or as an alternative, the MADD circuit could be implemented purely from distributed logic. The memory implementing the result store could be a dedicated RAM or a LUT-based SRAM.

Processing of the MAC unit may have a latency of a plurality of clock cycles. In particular, processing of the MADD circuit and a subsequent storage in the result store may require a number of clock cycles. Hence, a recently stored partial result may be available (and accessible or retrievable) after several clock cycles. This may delay processing due to delayed availability of recently modified addresses in the result store. To resolve this issue, the result store may buffer multiple results of operations of the processing core and the processing core may iteratively calculate different results for different input data using the same or different coefficients and/or parameters. Respective partial results are stored in the result store. After a number of clock cycles defining the latency of the MAC unit has lapsed, the processing core may return to processing of the initial input data to calculate a next partial result based on next or the same coefficients and/or parameters on the initial data that require the partial results stored in the result store. The result is accumulated with the required partial results from the result store. This design exploits latency of the hardware and enables pipelining without a complex hardware implementation of processing elements.

The memory of the MAC unit is different from conventional MACs that use registers to buffer results for subsequent accumulation. The result store according to embodiments of the present disclosure has several advantages over such register. Since in conventional MACs, the adder receives input from a single register, this may restrict accumulation to one area of input data only. Implementing sequential processing on input data using a single register may further require an increased amount of input data to be read. By providing an addressable result store in the processing elements, the processing elements may flexibly operate on several areas of input data and store a plurality of partial results for respective areas of the input data.

In yet another embodiment, the apparatus is configured to retrieve input data via the interface, the input data representing at least a part of an input layer of a neural network. The control module may receive configuration data via the interface indicating a layout and topology of the neural network and specifying the (convolution or any other) operations to be performed on each layer of the neural network.

In another embodiment, at least one processing module processes at least a part of a layer of a neural network, wherein data stored in the cache represent at least a part of a next layer of the neural network. Accordingly, the apparatus may receive input data of the input layer via the interface and store at least a part of generated results of the convolution operation on the input layer in the cache module, which may be used as input data for processing of a next layer of the neural network. This reduces the amount of data to be exchanged via the interface.

Preferably, the neural network is a convolutional neural network (CNN).

In a particularly preferred embodiment, the apparatus is a convolutional neural network accelerator.

It is to be understood that the apparatus, or respective hardware units of the apparatus, may be configured to perform a method according to one or more embodiments of the present disclosure.

According to one aspect of the present disclosure, a system comprising a processing host, at least one memory, and an interconnect is defined, wherein the system further comprises an apparatus according to any one embodiment of the present disclosure. The interconnect may be configured to couple the processing host, the at least one memory, and the apparatus, such that the apparatus may retrieve input data from the at least one memory via the interconnect. The apparatus may be an accelerator performing convolution operations. The processing host may load the required data, such as sensor or state data and other processing data, to the at least one memory, and may configure the apparatus to perform the desired (convolution or any other) operation. Subsequently, the host may configure the apparatus to receive (or retrieve) input data from the at least one memory in order to perform the required task. Upon completion, the apparatus may signal availability of the results to the processing host and/or may directly write back the results to the at least one memory.

Since the apparatus implements a cache module that may store at least a portion of data processed by respective processing modules, which may be accessed by the same or other processing modules to perform a desired operation in a next iteration, the number of data to be exchanged between the at least one memory and the apparatus via the interconnect is reduced. By providing the apparatus with a plurality of processing modules that will be individually configured to perform convolution operations and that may further individually retrieve and/or store data from/to the cache module and/or to the at least one memory via the interconnect, the apparatus may be flexibly adapted to a variety of convolution tasks and operations.

In a preferred embodiment, the interconnect is a system bus.

It is to be understood that components of the system may be configured to perform a method according to one or more embodiments of the present disclosure. Moreover, embodiments of the apparatus may be incorporated into embodiments of the system in any combination. Likewise, features of the system according to one embodiment of the present disclosure may be incorporated into at least one embodiment of the apparatus in any combination.

According to yet another aspect of the present disclosure, a method of operating an (accelerator) apparatus according to one or more embodiments of the present disclosure is defined.

Embodiments and examples of the present disclosure refer to various modules, units, cores, or elements. It is to be understood that the modules, units, cores and/or elements may be implemented as dedicated hardware and/or as hardware configured by software or firmware in order to perform a required functionality, in any combination. For example, the processing (or convolution) modules, the processing (or convolution) cores and/or the processing (or convolution) elements, in any combination, may be implemented in hardware based on FPGAs or ASICs or any other customized and/or programmable hardware. Similarly, the cache module, the data buffer, the coefficient buffer, and/or the result store, in any combination, may be implemented as memory circuitry. Each of the hardware components may be further configured by software and/or firmware to perform the required functionality as described in embodiments of the present disclosure. The control module, the input control unit, the output control unit and/or the convolution control unit, in any combination, may be implemented using general or dedicated processing hardware configured to perform the control operations and/or signaling as described in embodiment of the present disclosure. However, even though embodiments of the present disclosure are hardware-based, it is to be understood that these configurations are examples only and that the present disclosure is not limited to a particular implementation in hardware and/or software.

BRIEF DESCRIPTION OF THE SEVERAL VIEWS OF THE DRAWINGS

Specific features, aspects, and advantages of the present disclosure will be better understood with regard to the following description and accompanying drawings where.

DETAILED DESCRIPTION

In the following description, reference is made to figures or drawings, which show by way of illustration various embodiments. Also, various embodiments will be described below by referring to several examples. It is to be understood that the embodiments may include changes in design and structure without departing from the scope of the claimed subject matter.

Figure 1:
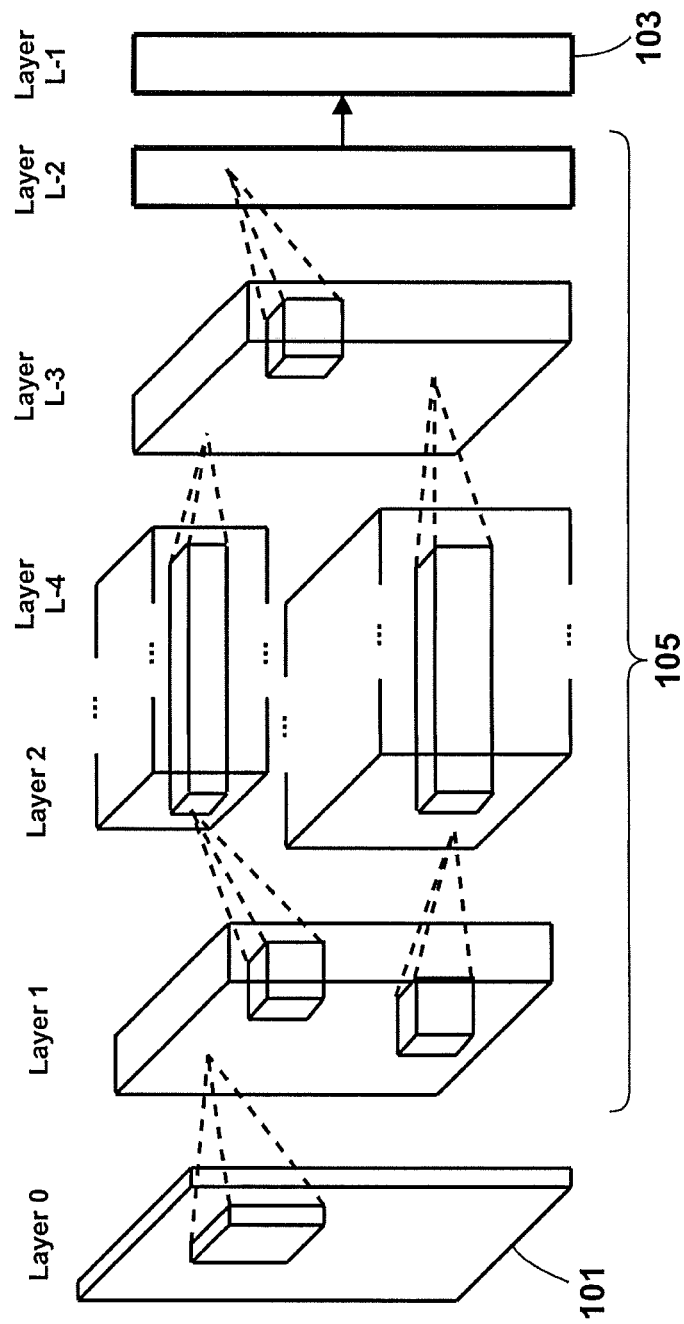
FIG. 1 shows a schematic illustration of a neural network that may be used in embodiments of the present disclosure.

FIG. 1 shows a schematic illustration of a neural network. Neural networks are well known systems used in artificial intelligence, machine learning, data mining, and other areas. Neural networks may be trained to identify or classify or otherwise characterize elements in input data. A neural network typically includes at least two interconnected layers, including an input layer 101 and an output layer 103, which are denoted as "Layer 0" and "Layer L–1" in FIG. 1. A neural network may also include one or more hidden layers 105, which are denoted as "Layer 1" to "Layer L–2" in FIG. 1. Each layer 101, 105, 103 may include a plurality of one-, two-, or multi-dimensional data elements or tensors that may be processed according to a mathematical operation, such as a convolution operation or a relational operation in order to determine respective data elements of the next layer of the neural network, which may also include one-, two-, or multi-dimensional data elements or tensors. The dimensionality and structure of the input and output layers of a neural network may be entirely defined via the mathematical operation interconnecting the adjacent layers of the neural network.

For example, input data on the input layer 101 of the neural network may include image data captured by a video camera, which may be, for example, mounted on a vehicle or in a wearable device, such as smart glasses, a headset, a head-mounted display, or a see-through display. The neural network may be trained to recognize objects within the image data, such as faces, traffic signs, other vehicles, and the like. A respective classification and further data related to the object may be provided in the output layer 103.

Even though FIG. 1 is showing a particular type of a neural network, which may be, for example, used to perform computer vision tasks or algorithms on input images, it is to be understood that the present disclosure is not limited to neural networks, a particular type of neural network, or a particular application area.

Figure 2:
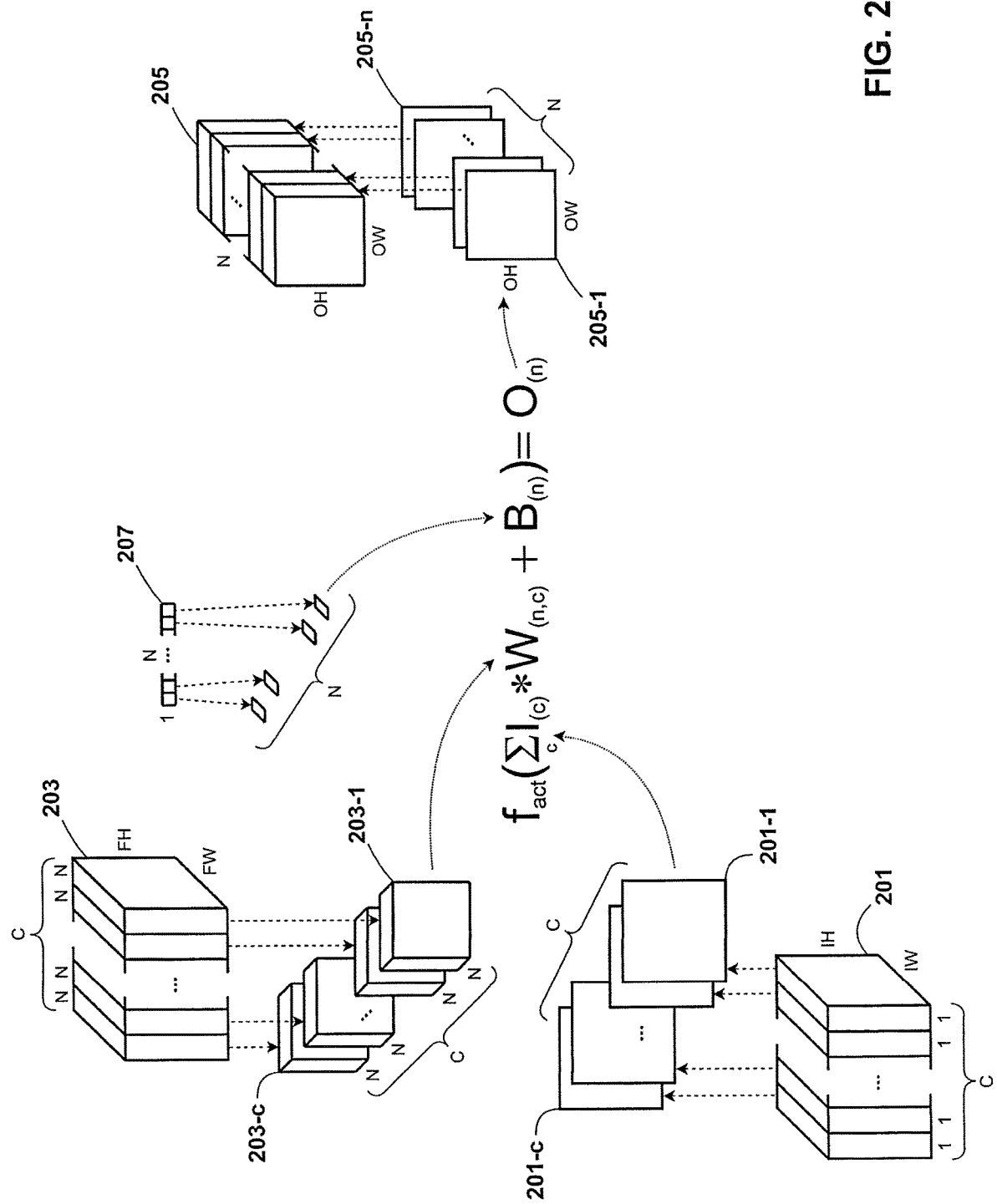
FIG. 2 represents a convolution operation that may be performed on layers of a neural network applicable in embodiments of the present disclosure.

The mathematical operation for calculating values of a next layer of the neural network may be represented as a convolution operation, which is depicted in FIG. 2. In FIG. 2, an input plane is defined as an input plane tensor 201 comprising a plurality of two-dimensional input planes of size IW×IH each. Each input plane 201-1, . . . , 201-c may be convolved with a weight matrix of a series of weight matrices 203-1, . . . , 203-c of a weight tensor 203 wherein each weight matrix contributes to one output plane 205-1, . . . , 205-n of an output plane tensor 205, which defines the values of the next layer of the neural network, after being mapped by activation function fact. Hence, for N output planes 205-1, . . . , 205-n, each of the series of weight matrices 203-1, . . . , 203-c includes N weight matrices. Accordingly, the weight tensor 203 for C input planes of the input plane tensor 201 and for N output planes of the output plane tensor 205 has a size of FW×FH×N×C. It is to be understood that throughout the disclosure a weight matrix may be understood as a coefficient matrix specifying weights or weight values as coefficients. Hence, in one or more embodiments, a weight matrix may be a coefficient matrix, wherein the coefficients represent weights (also referred to as weight coefficients throughout this disclosure). In one or more embodiments, weights could be generally understood as coefficients and, therefore, the terms weight matrix and coefficient matrix, as well as the terms weight (value), coefficient (value) and/or weight coefficient (value) could be used interchangeably throughout this disclosure.

The convolved result of the input plane 201-1, . . . , 201-c with respective weight matrices is further biased by a single bias value, that may form a bias vector 207 comprising the bias values for the individual output planes 205-1, . . . , 205-n.

The sum of the convolved input planes and weight matrices with the bias value is mapped by an activation function $f_{act}$ to generate the respective output plane 205-1, . . . , 205-n.

In general, the convolution operation may be defined as $$f_{act}\left(\sum_c I_{(c)} * W_{(n,c)} + B_{(n)}\right) = O_{(n)}$$

where $f_{act}$ is the activation function, $I_{(c)}$ is the input plane tensor 201, $W_{(n,c)}$ is the weight tensor 203, $B_{(n)}$ is the bias vector 207, and $O_{(n)}$ is the output plane tensor 205.

Figure 3:
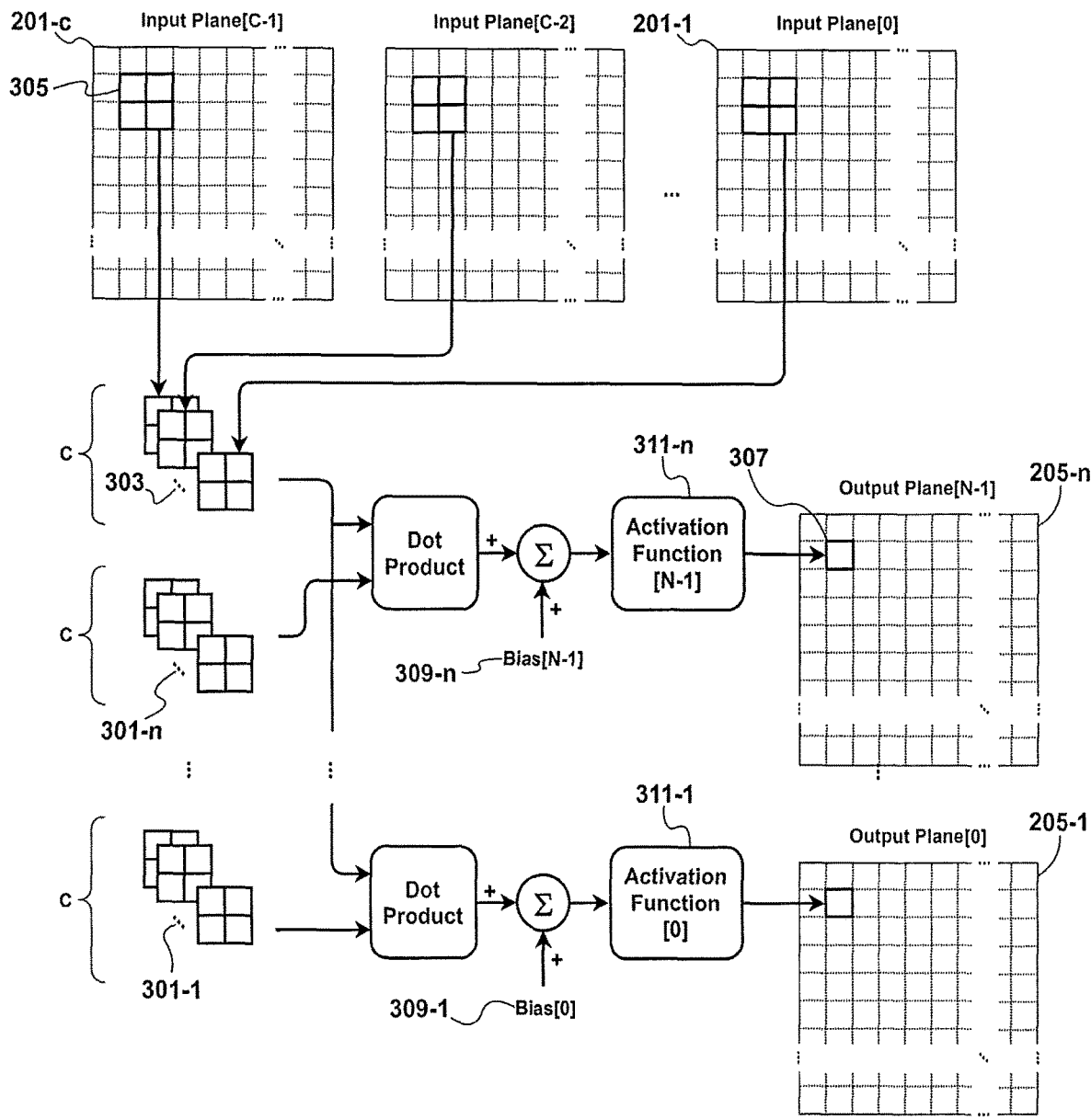
FIG. 3 illustrates a convolution operation for calculating a single element in a layer of a neural network applicable in an embodiment of the present disclosure.

FIG. 3 illustrates a convolution operation to calculate an element of an output plane tensor applicable in one or more embodiments of the present disclosure. Since the operation depicted in FIG. 3 may be based on elements as depicted in FIG. 2, same reference numerals have been used for the same or similar features.

An input plane tensor may include C input planes 201-1, . . . , 201-c. Likewise, the output plane tensor may include output planes 205-1, . . . , 205-n. A set of weight matrices 301-1, . . . , 301-n for the respective output planes 205-1, . . . , 205-n, which may be extracted from the series of weight matrices 203-1, . . . , 203-c as depicted in FIG. 2, are multiplied element-wise with data values 303 that are extracted from input planes 201-1, . . . , 201-c at respective locations 305, and summed per output plane 205-1, . . . , 205-n (dot product), to provide a single data result of convolution per output plane 205-1, ..., 205-n at location 307. Hence, locations 305 may correlate with location 307 in the output planes 205-1, ..., 205-n.

The input values 303 and weight matrices 301-1, ..., 301-n are respectively used for the convolution to compute a single value. This value is further biased by bias values 309-1, ..., 309-n, respectively, which may be defined by the bias vector 207 of FIG. 2. The result may be mapped by activation functions 311-1, ..., 311-n. The input data of each input plane 201-1, ..., 201-c contributes to an output value in each output plane 205-1, ..., 205-n. The contribution is controlled by respective weight matrices 301-1, ..., 301-n. The size of the weight matrices, which may also be referred to as a convolution kernel throughout this disclosure, may determine the respective size of an input area of input data in the input planes 201-1, ..., 201-c.

Figure 4:
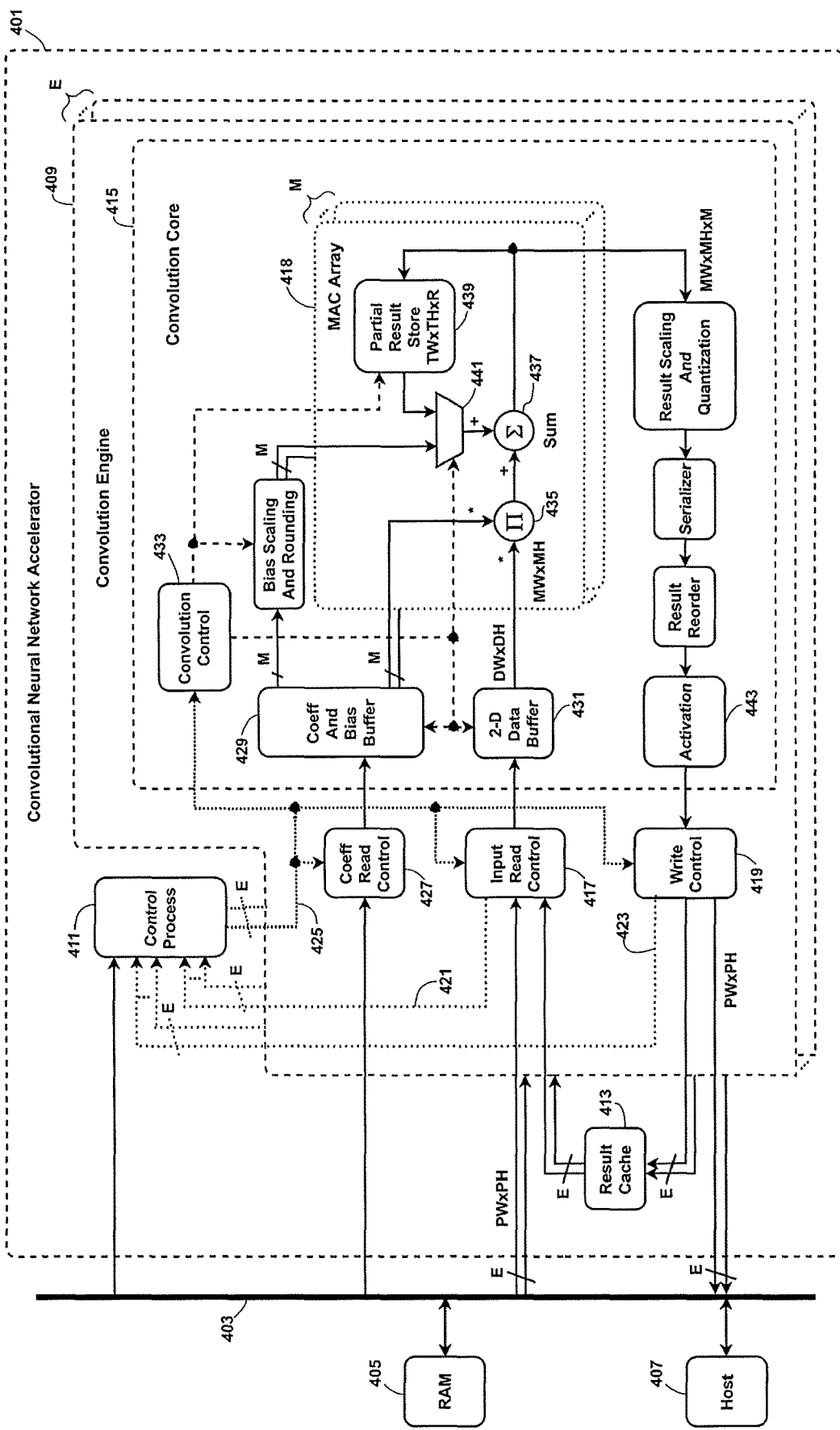
FIG. 4 depicts an accelerator apparatus according to one embodiment of the present disclosure.

FIG. 4 shows a schematic illustration of an apparatus according to one embodiment of the present disclosure. The apparatus 401 may be an accelerator for convolution operations that may support operations of a neural network, as depicted, for example, in FIGS. 1, 2, and 3. However, it is to be understood that even though the accelerator apparatus is described with regard to convolution operations of a neural network, the apparatus is not restricted to one particular scenario only and may, rather, accelerate any tasks or scenarios that involve a huge number of (convolution or any other) operations to be performed on input data.

The apparatus 401 may be coupled to an interconnect 403 via an interface. The interconnect may be, for example, a system bus or any other suitable connection or link to connect the apparatus 401 to an external memory 405 and a processing host 407. The processing host 407 may control operation of the apparatus 401 and may configure the apparatus 401 to process input data stored in the memory 405 in order to process the input data using convolution operations. The apparatus 401 may include a plurality of processing modules. In the embodiment of FIG. 4, the processing modules may be denoted as convolution modules 409, that may each be configured to process the input data stored in memory 405. The apparatus 401 may be configured with any number of convolution modules 409, such as E convolution modules as shown in FIG. 4. This enables parallel processing of a large number input data or parts of separate layers by the plurality of convolution modules 409. The convolution modules 409 may also be referred throughout this disclosure as convolution engine and both terms may be used interchangeably.

The apparatus 401 further includes a control module 411 that may control processing of each of the convolution modules 409 and a cache module 413. The cache module 413 may be connected to each of the convolution modules 409 and may be configured to store data processed by one or more of the convolution modules 409 and to enable each of the convolution modules 409 to retrieve the stored data as input data for further processing. The cache module 413 may be an on-chip memory. Since in integrated circuits, a majority of power is consumed by external hardware access, keeping the results in cache module 413 reduces power consumption. Moreover, an on-chip cache module 413 may allow for higher data exchange rates and a shorter latency period. The cache module 413 may include multiple write and read ports to provide the cached data with low-latency. Accordingly, the cache module 413 is to be understood as a low-energy low-latency on-chip memory, which does not require any sorting algorithms or other logic implementing a caching strategy.

The convolution modules may include a convolution core 415, an input control unit 417, and an output control unit 419. The convolution core 415 may process any input data by performing a (convolution or any other) operation using a plurality of processing elements 418, such as M processing elements 418.

The input control unit 417 may be configured to retrieve data that are processed by the convolution core 415. In particular, the input control unit 417 may retrieve data via the interface, such as data stored in memory 405 or data provided by the processing host 407 via the interconnect 403. The input control unit 417 may also be configured to retrieve data stored in the cache module 413. Hence, the input data to be processed by convolution core 415 may be either retrieved externally via the interface or may correspond to data that have been previously processed by any of the convolution modules 409. This reduces the amount of data to be transmitted via the interface and, therefore, saves bandwidth of interconnect 403. By providing a cache module within the apparatus 401 that is interconnected with each of the convolution modules 409, the convolution modules 409 may flexibly generate results that are fed back to other (or the same) convolution modules without requiring any data transmission via the interface. Accordingly, the output control unit 419 may be configured to provide the data processed by the convolution core 415 via the interface and interconnect 403 to the memory 405 and/or to the cache module 413. The output control unit 419 may also be configured to provide the data processed by the convolution core 415 via the interface and interconnect 403 to the processing host 407 either directly or via memory 405. For example, the output control unit 419 may write the data to the memory 405. Thereafter, the processing host 407 may be informed that results are available in memory 405 and the processing host 407 may retrieve the results from memory 405. In one example, the processing host 407 may have an addressable space, which may be addressed by the output control unit 419 during writing of the results.

The processing host 407 may configure the apparatus 401 by sending configuration data to the control module 411. The configuration data may include any definition of processing using data structures definitions, command sequences, and the like, using any suitable programming or description language. Each instruction to the apparatus 401 may be defined as a bit field concatenating a plurality of parameters into a single binary word, such as a long binary word. The parameters may include (i) layer operation type and parameters, such as area size, filter size, stride, dilation, convolution/deconvolution/pooling, scheduling dependency list, and the like, (ii) input plane location (RAM/cache), base address and plane offset, and the like, and/or (iii) output plane location (RAM/cache), base address and plane offset, and the like, and/or any other parameters specifying processing of the apparatus, in any combination.

The control module 411 may schedule commands between the plurality of convolution modules 409 responsive to states signaled by the plurality of convolution modules 409. The states may include one or more of an "input read complete" state, which may be signaled by the input control unit 417 via link 421, a "result ready" state or a "result write finished" state signaled by the output control unit 419 via link 423, and further states signaled by individual processing elements to the control module 411, in any combination. In one example, scheduling of commands may be controlled by the "result write finished" state which may be signaled to the control module 411 via link 423. The "result write finished" state may be a condition to schedule a next command that requires results of previous commands processing on current input data. The control module 411 may control processing of each convolution module 409 via (command) link 425 or any other signaling path available in the apparatus 401.

The convolution module 409 may further include a coefficient control unit 427, which may retrieve coefficient data via the interface from processing host 407 and/or memory 405. Similar to the input control unit 417 and the output control unit 419, the coefficient control unit 427 may be controlled by the control module 411 via (command) link 425 and may provide respective states regarding retrieval of coefficient data to the control module 411 and/or to the input control unit 417, in any combination, in order to enable a closed-loop control of data flow, as described below. However, it is to be understood that the coefficient control unit 427 may be completely optional. Rather, the coefficient control unit 427 may be only provided in embodiments that require processing of coefficient data.

To initiate operation, the processing host 407 may write a command sequence, coefficient sets, and input layer data into memory 405. This may include instructions and coefficients that define a neural network and the data of an input layer, such as the input layer 101 shown in FIG. 1. The processing host 407 may issue a start trigger to the control module 411 via interconnect 403. In response to the start trigger, the control module 411 may read at least a part of the command sequence from memory 405 and may schedule individual commands to the convolution modules 409.

The provision of commands via memory 405 may be advantageous if the same command sequence has to be iteratively executed on consecutive input layers. In this case, the control module 411 may be configured to re-read an initially stored command sequence from memory 405, after each iteration. Additionally or as an alternative, depending on an internal storage capacity of the control module 411, the control module 411 may be configured to read the command sequence from memory 405 in a single pass and to re-use the command sequence after each start trigger. Accordingly, the processing host 407 may only be required to write data of a next input layer into the memory 405 and read results of an output layer from the memory 405 at each completion.

Storing commands in memory 405 enables an execution on the apparatus 401, such as execution of a neural network, without involvement of the processing host 407 during execution, except for an initial writing of the command sequence, coefficient sets, and input layer data to the memory 405. Subsequently, only the data of next layers, which may be (subsequent) internal layers of the neural network, input layers of next frames, or generally next input layers that may host writes, are to be written into memory 405 and final or intermediate execution results are to be read from the memory 405. In one embodiment, copying of the data to and/or from the memory 405 can be done by a DMA process.

Further to the plurality of processing elements 418, the convolution core 415 may include a data buffer 431, and a convolution control unit 433. Moreover, in embodiments that require processing of coefficient data and that may include the coefficient control unit 427, each (or at least some) processing element(s) 418 may include a coefficient buffer 429. The coefficient buffer 429 may be controlled by the coefficient control unit 427 and may store coefficient data required for the subsequent convolution operation. The data buffer 431 may be controlled by the input control unit 417 and may store data required for the subsequent convolution operation by the plurality of processing elements 418. The coefficient buffer 429 may be a memory array configured to store the respective coefficients and to provide the coefficients to the plurality of processing elements 418. The coefficient buffer 429 may include a plurality of separate links to provide the different coefficient data, such as weight coefficients to each of the plurality of processing elements 418.

The coefficient control unit 427 may read coefficient and bias values from memory 405. The coefficient and bias values may be stored in the memory 405 in a compressed, variable format in order to minimize memory bandwidth. The coefficient control unit 427 may be configured to decompress the coefficient and bias values and forward them to the coefficient buffer 429 in a fixed, final format.

The convolution control unit 433 may apply a scheduling and control scheme to ensure that each processing element 418 is provided with correct input data from the coefficient buffer 429 and data buffer 431 to perform the operation. The convolution control unit 433 may further monitor processing of the processing elements 418 in order to avoid process-stall between window positions or input planes. The scheduling and control scheme may be numerically-controlled oscillator (NCO) based. In this example, coefficient and data selection patterns may be generated by NCOs. Typically, NCOs may generate periodical values. Additionally or as an alternative, the scheduling and control scheme may be a lookup table (LUT)-based mechanism, where coefficient and data selection patterns are defined in lookup tables. Content of the lookup tables may be defined together with coefficient sets. LUTs may be used to select positions of or assign positions to coefficient values of respective coefficient sets. In combination, a coefficient set and a LUT may be used to define matrices of arbitrary shape and sparseness as filter kernels. The convolution control unit 433 may step over elements of the LUT and may use the elements as coordinates to select coefficients from the matrix, or coordinates to assign to the coefficient values of the coefficient set for convolution. Accordingly, a coefficient set and its LUT may correspond to each other. The coefficient control unit 427 may read any LUTs together with the coefficient sets. Lookup tables enable a simplified definition of various processing parameters, such as a definition of which coefficient positions inside a coefficient matrix are to be used if it contains zero values at some places. This enables a definition of coefficient matrices of an arbitrary shape for input/output plane pairs.

The data buffer 431 may be configured as a two-dimensional data buffer, which may store the input data retrieved by the input control unit 417 as a two-dimensional array. Accordingly, the data in the data buffer 431 may be accessed using two indices. In preferred embodiments, data in the data buffer 431 may be retrieved via an adjustable input window, as described, for example, in FIG. 14. The data buffer 431 may enable access to the input data stored in the data buffer 431 to all processing elements of the plurality of processing elements 418. A determination and retrieval of input data required for performing the convolution operation on a respective processing element 418 may be achieved by adjusting the input window to sample on the same input data from the data buffer 431 while taking into consideration different coefficient values from coefficient buffer 429.

The input control unit 417 may feed the convolution core 415 with input data. For example, the input data may be input pixels. The input control unit 417 may ensure that a tile of input data, such as a tile of pixels, is read into the data buffer 431. At least a part of the tile may include an overlap with one or more neighboring tiles or padding values.

The convolution operation may be implemented by each of the plurality of processing elements 418 by providing a multiply-accumulate circuit (MAC), which may include a multiplier 435, a sum 437 and a result store 439 configured to buffer results. Each processing element of the plurality of processing elements 418 may further include a multiplexer 441 to determine the input of the sum 437 to either initialize the sum with a bias value or to accumulate the results of the multiplier 435 with the partial results stored in the result store 439.

The result store 439 may be implemented as an addressable memory, such as an addressable SRAM. By providing an addressable result store 439 in the processing elements 418, the processing elements 418 may flexibly operate on several areas of input data and store a plurality of partial results for respective areas of the input data in the addressable result store 439. The result store 439 may have a capacity of R output tiles of size TW×TH. Accordingly, in each processing element 418, the result store 439 may buffer up to R output tiles, in order to extend the calculation capacity of the convolution core 415 to M×R output tiles for a single input plane sequence.

The results of the plurality of processing elements 418 may be provided to several subsequent processing elements of the convolution core 415, including one or more of a result scaling and quantization unit, a serializer, a result reorder unit, and further processing units which may be configured to perform particular tasks to postprocess results of the plurality of processing elements 418. Moreover, results of the processing may be provided to an activation unit 443, which may implement an activation function and to provide the final results to the output control unit 419. For example, convolution product accumulation may result in an increased word length with growing kernel size and input plane count, effectively increasing the word length of the accumulated product. In order to enable operation at full precision in the processing elements 418, only the final results may be down-scaled and quantized back to the input word length in the result scaling and quantization unit.

The apparatus 401 may be used as an accelerator for convolutional neural networks (CNNs). For example, the input data retrieved via the interconnect 403 from memory 405 may represent an input layer of the CNN, and each convolution module 409 may process at least a part of a layer of the CNN. Moreover, data stored in the cache module 413 may represent at least a part of a next layer of the CNN to be processed by the same or another convolution module of the plurality of convolution modules 409.

During initialization, processing host 407 may load the input plane tensor of the input layer and the weight tensor into the memory 405. For example, the input plane tensor and the weight tensor may correspond to the input plane tensor 201 and the weight tensor 203 as depicted in FIG. 2. Moreover, the processing host 307 may load a command sequence into the memory 405. As soon as the input plane tensor, the weight tensor and the command sequence are loaded into memory 405, the processing host 407 may trigger operation of the apparatus 401 via the control module 411. The control module 411 may retrieve the command sequence from memory 405 and may act as an arbiter to schedule commands of the command sequence between the plurality of convolution modules 409.

As the control module 411 schedules a command to execute in one of the plurality of convolution modules 409, the respective input control unit 417 and coefficient control unit 427 of the convolution module 409 retrieve input data of at least a part of the input planes and their weight tensors, respectively, from the memory 405. The input planes may have a size of IW×IH and may be divided into a plurality of tiles and the convolution module 409 may retrieve one or more of the tiles.

Scheduling of commands by the control module 411 to one or more of the plurality of convolution modules 409 may depend on completion of previous commands. Each convolution module 409 may comprise connections between the input control unit 417 and the output control unit 419 and the control module 411, respectively, such as links 421, 423. The connections may be configured to transmit flags or similar signals that may include, for example, a command identifier, a completion marker field, and the like, in any combination. The flags may include a command completion flag from the input control unit 417. This command completion flag may indicate a scheduling condition that may trigger a next command that requires input data, but does not require results of current processing. The flags may further include a command completion flag from the output control unit 419. This command completion flag may indicate a scheduling condition that may trigger a next command that requires results of current processing, at any convolution module 409.

In order to enable a flag-based scheduling, each command may define dependencies to previous commands and conditions in a dependency list, which may be checked by the control module 411 based on flags provided by one or more of the convolution modules 409 (or their units). The dependencies may be checked for a defined number of commands around a currently executed command, which may define a moving window for dependency checks. This may reduce the number of entries of the dependency list to a fixed number of bits.

When scheduled, a command may be sent to a desired convolution module 409 from the control module 411. The command may be an instruction word consisting of multiple bit fields. The instruction word may be provided to each stage inside of the convolution module 409 in parallel, such as to buffers 429, 431, and convolution control unit 433. Upon receipt, the stages of the convolution module 409 may start its execution individually, using only those bit fields that are required for processing of the respective stage. To control data flow, the convolution modules 409 may apply a closed-loop control approach to maintain coefficient and data availability at start of processing of the convolution cores 415 and/or processing elements 418. The control module 411 may schedule a command as an instruction to a convolution module 409. This may be a single instruction word including one or more of an input plane read base address, a plane address offset, a plane count, type and parameters of arithmetical operation, a coefficient read base address, an output plane write base address, a plane offset, and the like, in any combination. Each stage of the convolution module 409 may receive the instruction in parallel and may start execution individually using relevant parts of the instruction word.

According to one example, the closed-loop control for data flow may include one or more of the following steps:

1. The coefficient control unit 427 may continuously monitor a filling level or available space in the coefficient buffer 429 and may read coefficients of a next input plane via the interface if there is enough free space available in the coefficient buffer 429. When the coefficients are read, the coefficient control unit 427 may send a completion flag to the input control unit 417.

2. The input control unit 417 may continuously monitor a filling level or available space in the data buffer 431. After receiving the completion flag from the coefficient control unit 427, the input control unit 417 may read data of a next input plane via the interface and/or from the cache module 413 and may write the data to the data buffer 431 if there is enough free space available.

3. The convolution control unit 433 may continuously monitor a filling level of the data buffer 431 and may start arithmetical operations as soon as the required data are present in the data buffer 431. This may also be signaled by the input control unit 417 to the convolution control unit 433 using respective flags. At this stage, the required coefficients are present in the coefficient buffer 429 since the completion flag sent by the coefficient control unit 427 is a pre-condition for reading of data into the data buffer 431. Hence, after checking the filling level of the data buffer 431, the convolution control unit 433 may start to generate read positions for coefficients and data from the coefficient data buffer 429 and the data buffer 431, respectively, to drive one or more of the processing elements 418.

4. After calculations on a current input data have been finished, the convolution control unit 433 may flush the data out of the data buffer 431 and at least a part of the associated coefficients from the coefficient buffer 429. The available space may be monitored in steps 1. and 2. above, and the coefficient control unit 427 and the input control unit 417 may continue reading further coefficients and input data in order to trigger next processing according to step 3.

Accordingly, the convolution control unit 433 may control arithmetical operations, and the control module 411 may control scheduling in the apparatus 401. Both the coefficient buffer 429 and the data buffer 431 may be configured to store several sets of coefficients, such as for multiple input planes, and data, such as multiple data tiles, to enable the convolution core 415 to directly continue processing on a next input plane after finishing processing on a current input plane without having to wait for a further retrieval of coefficients or data. This may balance operation of the processing elements 418 and provide a continuous operation. The closed-loop control ensures an optimal filling of the coefficient buffer 429 and data buffer 431. This increases data throughput which is only limited by hardware constraints of the interface.

The closed-loop control of data flow may be defined in one or more embodiments of the present disclosure. However, it is to be understood that parts of the closed-loop control may be implemented and that different data flow control approaches may be used in other embodiments. In particular, the data flow may be controlled by other components and/or in a different order, and the present disclosure is not limited to a particular type of closed-loop control of data flow.

Figure 5:
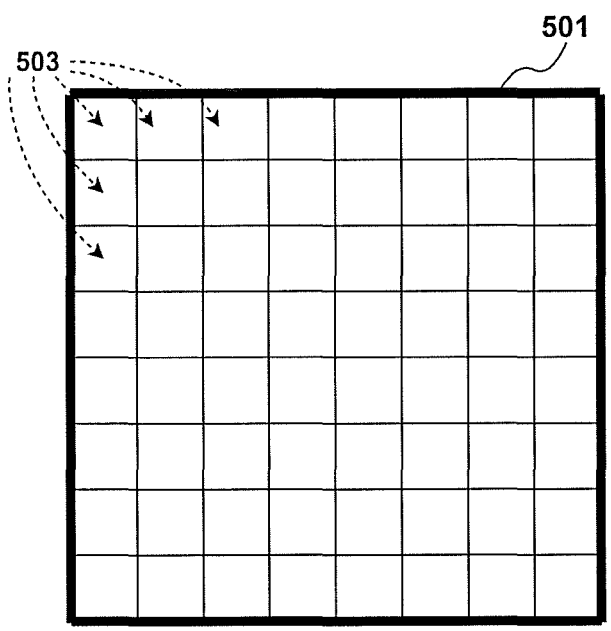
FIG. 5 shows a structure of an input tile of input data processed by one or more embodiments of the present disclosure.

FIG. 5 illustrates an input tile 501 that is composed of a plurality of data elements 503, such as data words. The data elements 503 may represent a two-dimensional area with a size of PW×PH. The data elements 503 may be sequentially retrieved from the memory 405 by the input control unit 417 in order to assemble the input tile 501. As shown in FIG. 5, the input tile 501 may consist of an array of 8×8 data elements. However, it is to be understood that a different size of data elements 503 or another partitioning of the input tile 501 may be chosen and that the present disclosure is not limited to an input tile including 8×8 data words.

Figure 6:
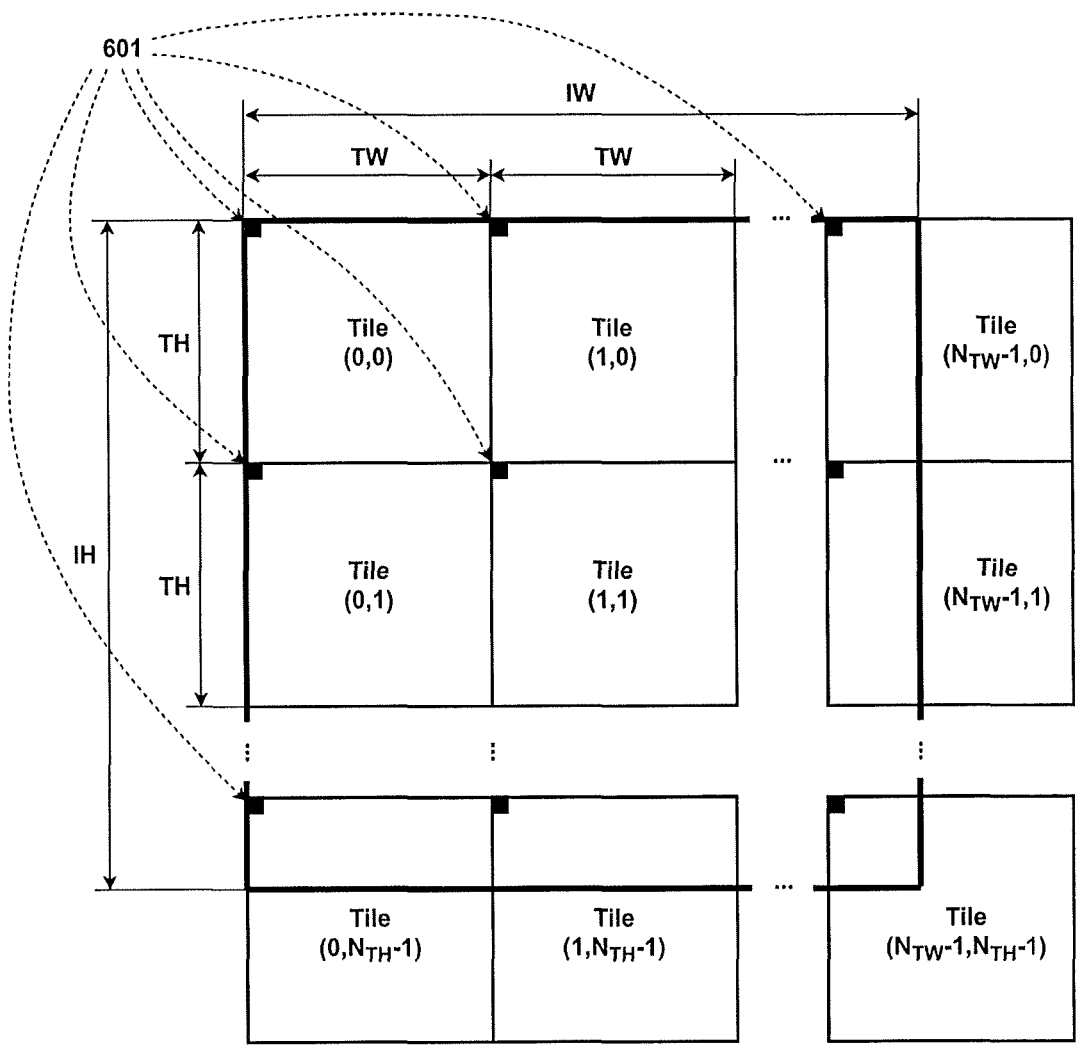
FIG. 6 illustrates partitioning of an input plane area into input tiles according to one or more embodiments of the present disclosure.

FIG. 6 shows a partitioning of the input plane of a size IW×IH into a plurality of input tiles, such as the input tile 501 in FIG. 5. As shown in FIG. 6, each input tile may have a tile origin 601. Referring back to FIG. 4, the input tiles 501 may define a basic processing unit of the apparatus 401. By partitioning the input plane into a plurality of input tiles at respective tile origins 601, the apparatus 401 may be flexibly adapted to perform convolution operations on input planes of a variable size. The apparatus 401 may be configured to process an input tile area in one sequence. The apparatus 401 may sequentially read input tiles at the same tile origin 601 across the input planes of the input plane tensor to execute the convolution operation, wherein the resulting output tiles may correspond to output tile across the one or more output planes of the output plane tensor having the same origin. Hence, the apparatus 401 may process the input plane tensor by proceeding over tile origins 601 and executing sequential calculations from each tile origin 601, across the one or more input planes. By slicing the input plane tensor into input tiles of a fixed size, the operation of the accelerator 401 may be independent of a particular size of the input planes of the input plane tensor. The input plane tensor is subdivided and processed in sequential steps at different tile origins 601.

In one or more preferred embodiments, the input data may include the tile data as well as additional data surrounding the tile, which may be required to enable convolution of a weight kernel of a particular size on the edges of the tile. For example, a kernel size of 5×5 may require at least 2 additional rows at the top and on the left side (and/or at the bottom and on the right side) of the tile. Accordingly, except for a 1×1 weight kernel, the accelerator may read data from neighboring tiles accordingly to a required overlap of the weight kernel. The apparatus 401 may read the tile sequence at the same origin from the one or more input planes of the input plane tensor with the required surrounding data for a respective weight kernel and may execute the convolution operation to calculate the output plane data according to the tile sequence. In order to perform the convolution operation, each input tile may be subdivided into a plurality of processing areas that are subsequently accessed, sampled, and processed by the processing elements, as will be subsequently discussed with regard to embodiments of the present disclosure.

Even though embodiments of the present disclosure have been described with regard to convolution operations, it is to be understood that the present disclosure is not limited to convolution operations only. Rather, the processing elements 418 may implement, for example, a relational operation, which may be executed in parallel with or in place of the convolution operation. For example, in addition to or instead of multiplier 435 and sum 437, the one or more processing elements 418 may include a configurable comparator between result store 439 and output of the data buffer 431 in order to implement max pooling, such as a configurable window depth-wise pooling unit to perform layer operation, which may be required, for example, by certain types of CNNs.

In preferred embodiments, capacity of the result store 439 may be reduced in order to use a respective processing element 418 for operations where output plane(s) are calculated from a single input plane, wherein independent sets of output plane(s) may be calculated from every input plane. In this embodiment, the result store 439 may be a single register stage with a data word capacity of (sw*MW)×(sh*MH), with a direct feedback to the sum 437 through multiplexer 441, where sw and sh are the maximal horizontal and vertical de-convolution stride values, respectively, if de-convolution is to be used, and 1 otherwise. Moreover if the convolution core 415 is to be used only to calculate a single output plane from a single input plane then M can be 1. These operations may be called plane-wise operations, including, for example, plane-wise convolution/de-convolution and plane-wise pooling.

Embodiments of the present disclosure may be configured to enable one or more of the following operations: convolution (plane-wise or in-depth), de-convolution (plane-wise or in-depth), max-pooling (plane-wise or in-depth), average pooling (plane-wise or in-depth), fully connected layer (by loading connection weights to data buffer 431 and each input plane data value individually to coefficient buffer 429 as individual 1×1 filters), matrix multiplication, and/or activation layer (by implementing, for example, an activation LUT in activation unit 443).

It is to be understood that the present disclosure is not limited to a particular configuration of a neural network. Rather, one or more embodiments of the present disclosure may be used to implement various configurations of neural networks.

Figure 7:
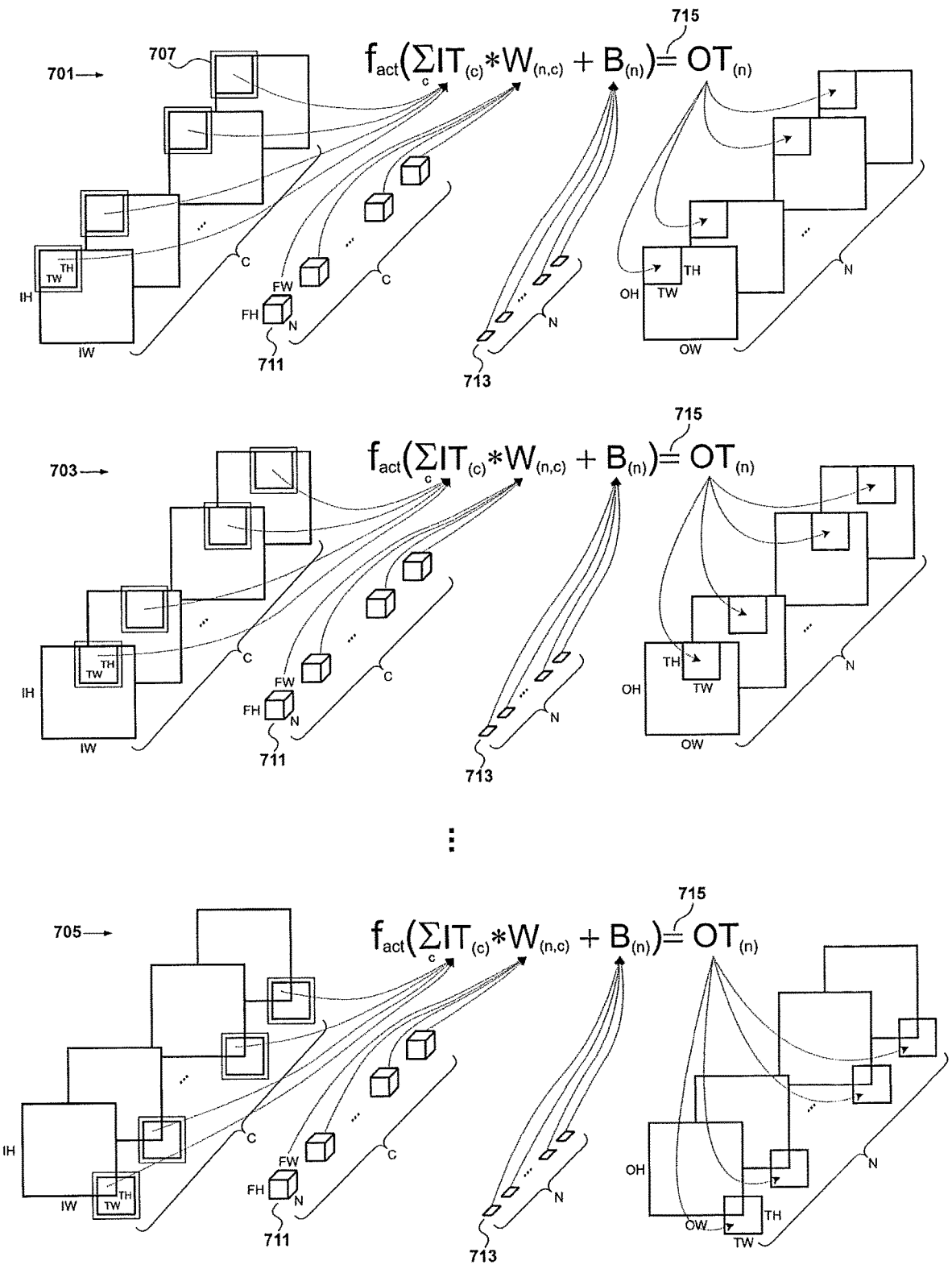
FIG. 7 illustrates calculation of output data based on input tiles according to one or more embodiments of the present disclosure.

FIG. 7 illustrates processing of a tile sequence by an apparatus according to one embodiment of the present disclosure. The apparatus may correspond to the apparatus 401 as shown in FIG. 4. Moreover, tiles of an input plane tensor and tiles of an output plane tensor may be configured according to tiles shown in FIGS. 5 and 6.

FIG. 7 shows the calculation for respective input tile sequences at the same origin in lines 701, 703, 705. In line 701, a tile sequence at the top-left origin 707 may be calculated, followed by a tile sequence at an adjacent position, as shown in line 703. The processing may end at a last tile origin 709 in line 705. While values of weight matrix sets 711 and bias values 713 may remain the same in each line 701, 703, 705, only the locations (or origins) of the input tiles in the input and output planes may change in each line 701, 703, 705. Calculations on input tiles with an area of a fixed size at each sequence 701, 703, 705 enable processing capabilities that are independent of any input and output plane (or tensor) sizes.

The accelerator apparatus 401 may be configured to read an input tile sequence IT(c) at a same origin across one or more input planes of the input plane tensor in parallel or sequentially, to perform the convolution operation on the same tile area, as represented by convolution equation 715, in order to produce an output tile OT(n). The sequence is repeated at subsequent tile origins, as illustrated in line 703, 705 in order to complete convolution of the entire input plane tensor with weight matrix sets 711 and bias values 713.

With reference to the apparatus 401 of FIG. 4, the input control unit 417 may fill the data buffer 431 with input data that reconstructs at least an area of an input tile and surrounding overlap, if required, and enables access to the input data using a positionable and adjustable input window of a size DW×DH on a per clock cycle basis.

As the input control unit 417 reads the input tiles IT(c), the coefficient control unit 427 may read bias values B(n) for the respective output planes to be calculated. As a next step or prior to reading the bias values B(n), the coefficient control unit 427 may read the required matrix sets of the weight matrix tensor 711 W(n,c) per input tile IT(c).

The weight matrix sets 711 W(n,c) and the bias values 713 B(n) may be provided to the coefficient buffer 429 that may provide simultaneous access to parameters for M output planes containing a single coefficient from a weight matrix of the weight matrix set 711 W(n,c) and a bias value from the bias values 713 B(n), per output plane. The M single weight matrix coefficients may be sourced from the same location of matrices per access.

Hence, with a single weight coefficient per output plane, the convolution core 415 may calculate partial results for a DW×DH area on M output tiles OT(n) simultaneously by element-wise multiplication of the single weight coefficient and the input data of the DW×DH area in M processing elements 418.

Referring back to FIG. 4, the convolution control unit 433 of the convolution core 415 may be configured to drive the coefficient buffer 429 and the data buffer 431 to simultaneously provide W(n,c) and a respective input area of size DW×DH of input data of the input tiles IT(c) as multiplication operands of the convolution equation 715 as input to the multiplier 435 in each of the plurality of processing elements 418. The bias values of the bias vector B(n) 713 may be read (and selected by multiplexer 441) by the respective processing elements 418 at a first calculation cycle of the processing element to be considered during computation of the partial result that is stored in the result store 439, and completed in subsequent iterations. Hence, accumulation of results may be achieved by the result store 439. The multiplexer 441 may initially select input from a bias scaling and rounding element as operand to sum 437. In subsequent cycles, the multiplexer 441 may select the output of the result store 439 as an operand to the sum 437 to implement the accumulation. The bias scaling and rounding element may add an offset, together with an up-scaled bias value, proportional to the magnitude range of the result to the processed coefficients. The values applied by the bias scaling and rounding element, such as bias value and bias scaling value, may be specified in a definition of a neural network, such as inside of a command word. This may reduce the effect of introducing asymmetrical errors in quantized values due to truncation of high world-length accumulation results.

Still referring to FIG. 4, the convolution control unit 433 may trigger a read of the result store 439 aligned to a read to the data buffer 431 and coefficient buffer 429 to present accumulated partial results of the same output plane at a position for which the actual product is being calculated, at the same time as input at the sum 437. The product added to the accumulated partial results (output of the sum 437) may be written back to the result store 439 as a further accumulated partial result.

By reading the input tile area at a cardinality of DW×DH for a single weight coefficient to be applied per output plane, the convolution core 415 may implement calculation of partial results per clock cycle for a DW×DH area on each of M output tiles OT(n) of an output plane utilizing M processing elements 418. The convolution control unit 433 may step over all weight matrix coefficients of W(n,c) and may read input data of cardinality of DW×DH as an offset from calculation area origins corresponding to the coefficient position from the data buffer 431 to form a full convolution operation for the weight kernel over the DW×DH input data locations in parallel.

In one or more embodiments, different convolution modules 409 may process neighboring tile sequences in parallel. For example, the tile sequence in line 701 of FIG. 7 may be calculated by a first convolution module, the tile sequence in line 703 of FIG. 7 may be calculated by a second convolution module, and the tile sequence in line 705 may be calculated by yet another convolution module of the apparatus 401. In each convolution module 409, the processing elements 418 may get the same data related to the respective tile sequence from data buffer 431. This configuration may represent parallel processing of the convolution modules 409 over an input plane area.

In one or more embodiments, the apparatus 401 may be configured to calculate the tile sequence at a tile origin over the input planes of the input plane tensor by a plurality of convolution modules 409 in parallel. This configuration may represent parallel processing of the convolution modules 409 over output planes.

In one or more embodiments, the apparatus 401 may be configured to distribute calculation of tile sequences across the plurality of convolution modules 409, wherein different processing elements 418 may calculate partial areas of input tiles in parallel. This is enabled by respective parallel connections from data buffer 431 to each processing element 418 in the convolution core 415. This configuration may represent parallel processing of the processing elements 418 over an input tile area.

According to one embodiment described above, the apparatus 401 may be configured such that different convolution modules 409 may calculate different tile sequences at different origins in parallel (parallel processing over an input plane area, as described above). According to another embodiment, different convolution modules 409 may calculate, at the same tile origin (and reading the same tile sequence), a number of R*M different output planes, to complete an overall output plane count generated by a neural network layer (parallel processing over output planes, as described above). In yet another embodiment, a window size DW×DH of data buffer 431 could be enlarged to DW=w*MW, DH=h*MH, which may enable operation of w*h processing elements 418 on the enlarged DW×DH window for the same R*M output planes (parallel processing over an input tile area, as described above). It is to be understood, that in other embodiments, the plurality of convolution modules 409 and the plurality of processing elements 418 in each convolution module 409 may be used in various (and different) ways and configurations in order to enable parallel processing on the input data.

Returning back to FIG. 4, the convolution control unit 433 may extend any processing to accumulate convolution results of an input tile IT(c) for a required area on each output tile OT(n) in sequential steps. The convolution control unit 433 may repeat a convolution sequence at each required calculation area origin (input area origin) within each input tile IT(c) to generate required partial results for respective area of an output tile OT(n), as will be described further below with regard to FIGS. 8 to 13. The terms calculation area origin and input area origin may be used throughout this disclosure interchangeably. The convolution control unit 433 may further repeat a convolution operation by the processing elements 418 in groups of M utilizing a parallelism of the plurality of processing elements 418 to produce up to R*M output tiles of output planes that will be stored in the result store 439.

If the capacity of the result store 439 corresponds to TW×TH×R data elements per processing element 418, the convolution core 415 may store accumulation data for R*M output tiles. This may reduce the number of input plane sequence reads to produce N output planes to N/M/R.

In order to calculate N output planes, a control unit 411 may write R*M output plane results of the convolution module 409 to the cache module 413 and re-read input planes into the same or into other convolution modules 409 for calculating a next group of R*M output planes until calculation of all N output planes to be produced by an actual layer of the neural network is completed. After completing the convolution on an input tile IT(c) of an input plane with a corresponding weight tensor, the convolution control unit 433 may continue with a next input tile IT(c) of an input plane and respective weight values that are read from the data buffer 431 and the coefficient buffer 429, respectively, to generate a full convolution of input planes and weight tensors for a current layer of the neural network.

Using a single weight coefficient in each cycle from the weight matrix per output plane makes the utilization of the processing elements 418 independent of any weight matrix size and fully scalable for any weight matrix sizes and shapes while maintaining full functionality of the convolution operation.

If the number of output planes N is a fraction of the number of processing elements M, an enlarged input window of the data buffer 431 of size DW×DH=(w*MW)×(h*MH) may group multiple processing elements 418 to calculate adjacent MW×MH input area parts of DW×DH for the same output plane rather than calculating different output planes per processing element 418.

Still referring to FIG. 4, command execution by the apparatus 401 may be done by reading a full sequence of input tiles from the same origin over all input planes and performing convolution operation with weight matrices to compute the output tiles of output planes. Results for a single output tile of the output planes may be completed during a final accumulation cycle based on weight coefficients for a last input plane.

Figure 8:
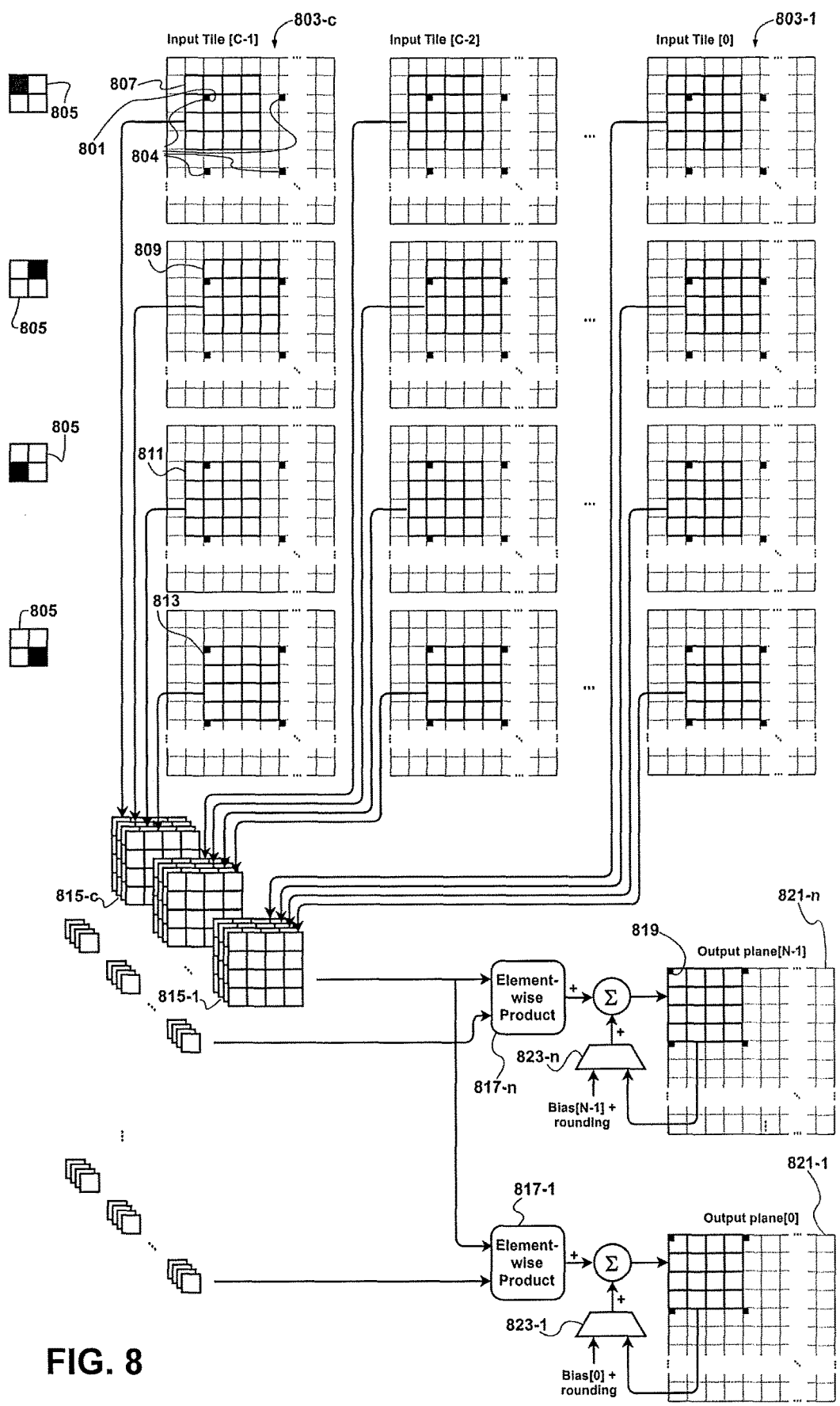
FIG. 8 shows a schematic illustration of a convolution operation for an input tile applicable in one or more embodiments of the present disclosure.

FIG. 8 illustrates computation related to a tile sequence, including calculation at a single calculation origin on an input tile sequence, as shown in one of the lines 701, 703, and 705 of FIG. 7 at a single calculation origin. FIG. 8 shows an input tile sequence of a plurality of input tiles 803-1, ..., 803-c at a same tile origin, such as one of the tile origins 601 in FIG. 6, across corresponding input planes. The input tiles 803-1, ..., 803-c are subdivided into consecutive and adjacent input areas at a plurality of input area origins 804 distributed across each the input tiles 803-1, ..., 803-c. The input areas may be extended to enable processing at the border of the input area, if required. Data elements at the input areas may be sampled by positioning an input window 807, 809, 811, 813 over the data elements of the input tiles 803-1, ..., 803-c with respect to the input area origins 804. As shown in FIG. 8, the input windows 807, 809, 811, 813 are positioned with respect to an input area origin 801, which may also be denoted as a calculation origin. The positioning may be influenced by a mapping to values of a filter kernel 805. Each input window 807, 809, 811, 813 may be used to sample data values of the underlying (possibly extended) input area in one of the input tiles 803-1, ..., 803-c, leading to input area sets 815-1, ..., 815-c that each represent values of a single input plane 803-1, ..., 803-c sampled by respective input windows 807, 809, 811, 813. Accordingly, the input window may be moved to a respective position on a per cycle basis to capture the underlying data elements of the input tile 803-1, ..., 803-c, respectively. The cycle-based captured data in sets 815-1, ..., 815-c may be used as a first operand for an element-based product calculation in processing items 817-1, ..., 817-n that are each associated with a corresponding output area 819 at a same location of a plurality of output tiles 821-1, ..., 821-n across corresponding output planes. The other input to the element-based product calculation by processing items 817-1, ..., 817-n may be a respective weight coefficient selected by the position in the filter kernel 805 for a corresponding output tile 821-1, ..., 821-n. Accordingly, the filter kernel 805 may correspond to or may be defined as a weight matrix that specifies respective weight (or filter) coefficients.

Referring back to FIG. 4, the element-based product operation and subsequent accumulation of partial results of the sets 815-1, . . . , 815-c may be performed by the processing element 418 of the convolution core 415. The partial results may be accumulated in result store 439 for each output tile 821-1, . . . , 821-n. Each result store 439 may accumulate up to R output tiles per processing element 418, in sequential steps, using a corresponding weight kernel for the actual output plane along R.

As illustrated in FIG. 8, in one embodiment, after positioning the input windows 807, 809, 811, 813 over the input tile 803-1 of a first input plane and calculating corresponding partial results accumulated in the result store 439, the sequence may continue with positioning the input windows 807, 809, 811, 813 over the input tile of the next input plane and so forth until the input tile 803-c of the last input plane, which results in the set 815-c. Accordingly, on each input tile 803-1, . . . , 803-c, the input window iterates over all positions of the input area according to the filter kernel 805 at the input area origin 801 to accumulate all element-based products to generate the convolution result for the output area 819 of each output tile 821-1, . . . , 821-n.

In a preferred embodiment, calculations may be performed over all calculation origins of input tiles of a single input plane in order to generate at least partial results for all possible output planes before changing to a next input plane of the tile sequence. This processing may be defined according to one or more of the following items that may use calculation windows 807, 809, 811, 813 and that may be executed iteratively:

1. Step to a next calculation origin horizontally on the right side. If the horizontal end of the active area of the input tile is reached, then step back to the left-most position. The processing may continue with item 1 and/or may initiate execution of at least one step of item 2 in parallel.

2. Step to the next output tile stored in result store 439 (out of R). If the maximum number of output tiles is reached, then step back to the first output tile. The processing may continue with item 2 and/or may initiate execution of at least one step of item 3 in parallel.

3. Step to the next calculation origin vertically below. If the vertical end of the active area of the input tile is reached, then step back to the top-most position. The processing may continue with item 3 and/or may initiate execution of at least one step of item 4 in parallel.

4. Step to the next weight coefficient in the filter kernel horizontally. If the horizontal end of the filter kernel is reached, then step back to the first horizontal position inside the kernel. The processing may continue with item 4 and/or may initiate execution of at least one step of item 5 in parallel.

5. Step to the next weight coefficient in the filter kernel vertically. If the vertical end of the filter kernel is reached, then step back to the first vertical position inside the kernel. The processing may continue with item 5 and/or may initiate execution of item 6 in parallel.

6. When items 1 to 5 are iterated across the tile area of the current input plane (items 1 and 3), the output tiles (item 2), and the filter coefficients (items 4 and 5), depending on the availability of an next input plane, processing of one or more (or all) items 1 to 5 may be halted. The previous input tile is flushed from data buffer 431. The input control unit 417 and, if applicable, coefficient control unit 427 feed subsequent input (and coefficient) data according to a data-flow control to respective buffers 431, 429, such as the closed-loop control of data flow described above.

In one or more embodiments, the iteration order may change, in particular, if the result store 439 is a register array with a capacity of (sw*MW)×(sh*MH) data words since convolution of the complete filter kernel must be calculated at a calculation origin before changing to a next calculation origin. This changed order of iteration may be defined according to one or more of the following items:

1. Step to the next weight coefficient in the filter kernel horizontally. If the horizontal end of the filter kernel is reached, then step back to the first horizontal position inside the kernel. The processing may continue with item 1 and/or may initiate execution of at least one step of item 2 in parallel.

2. Step to the next weight coefficient in the filter kernel vertically. If the vertical end of the filter kernel is reached, then step back to the first vertical position inside the kernel. The processing may continue with item 2 and/or may initiate execution of item 3 in parallel.

3. Step to the next output tile stored in result store 439 (out of R). If the maximum number of output tiles is reached, then step back to the first output tile. The processing may continue with item 3 and/or may initiate execution of at least one step of item 4 in parallel.

4. Step to a next calculation origin horizontally on the right side. If the horizontal end of the active area of the input tile is reached, then step back to the left-most position. The processing may continue with item 4 and/or may initiate execution of at least one step of item 5 in parallel.

5. Step to the next calculation origin vertically below. If the vertical end of the active area of the input tile is reached, then step back to the top-most position. The processing may continue with item 5 and/or may initiate execution of item 6 in parallel.

6. When items 1 to 5 are iterated across the tile area of the current input plane (items 4 and 5), the output tiles (item 3), and the filter coefficients (items 1 and 2), depending on the availability of a next input plane, the processing of one or more (or all) items 1 to 5 may be halted. The previous input tile is flushed from data buffer 431. The input control unit 417 and, if applicable, coefficient control unit 427 feed subsequent input (and coefficient) data according to a data-flow control to respective buffers 431, 429, such as the closed-loop control of data flow described above.

If, during iteration of one or more of the embodiments described above, the current input tile is of the last input plane and the current weight coefficient is at the last position of the filter kernel both horizontally and vertically, then the current results generated by sum 437 in each processing element 418 may be output to subsequent processing components of the convolution core 415, such as to the results scaling and quantization unit, the serializer unit, the results reorder unit, and/or the activation unit 443, and any combination thereof in any order. The convolution core 415 may finish a command after iterating over the last input plane tile. Thereafter, a next command may be scheduled and processed by the convolution core 415.

In order to buffer one or more next commands in the convolution module 409, individual elements of the convolution module 409 may have an internal storage linked to the (command) link 425, such as a command FIFO, to enable the control unit 411 to schedule next command(s) in advance, wherein the next commands may be scheduled according to their dependency list and current flags or states as signaled by components of the convolution module 409. Preferably, the input control unit 417 may signal via link 421 the "input read complete" flag and/or the output control unit 419 may signal via link 423 the "result write finished" flag to the control module 411 to enable the control module 411 to maintain a maximum amount of next command(s) in the internal storage of the convolution modules 409. Bias multiplexers 823-1, . . . , 823-*n* may select a respective bias value for the output tiles 821-1, . . . , 821-*n* at a first calculation cycle, corresponding set 815-1 to initially add the contribution of the corresponding bias values to the partial results in the result store 439.

Referring back to FIG. 4, the tile-oriented and area-based calculation of the convolution operation by positioning an input window enables an efficient retrieval of input data and coefficient data via respective buffers 429 and 431. The processing for a single output area 819 for all output tiles 821-1, . . . , 821-*n* may be performed sequentially in one processing element, such as the processing element 418 of FIG. 4. However, it is to be understood that the computation of the output area 819 of one or more output tiles 821-1, . . . , 821-*n* may be split across two or more (or across all) processing elements 418 such that the output area 819 in one or more output tiles 821-1, . . . , 821-*n* may be calculated on different processing elements 418. Moreover, the output tiles 821-1, . . . , 821-*n* may be processed by different processing elements 418 of the plurality of processing elements in parallel. Hence, processing items 817-1, . . . , 817-*n* may correspond to different multipliers 435 of different processing elements 418 and the multiplexers 823-1, . . . , 823-*n* may correspond to different multiplexers 441 of different processing elements 418. In another embodiment, a processing element may also be configured to sequentially process a plurality of output tiles for a plurality of output planes 821-1, . . . , 821-*n* and store the partial results in respective separate areas of the result store 439. The result store 439 may be configured to store up to R output tiles. If M processing elements 418 are provided, the output tile capacity may be M*R. Each processing element 418 may get the same DW×DH input window data and can calculate results for different output tiles, M in parallel and R sequentially, resulting in M*R output tiles. M and R may be configurable during logic design based on requirements of the targeted operations. For hardware resources, M may determine the amount of parallel processing elements 418 and R may determine the physical capacity of the result store 439 in each processing element 418. In another embodiment, as described above, if DW×DH= (w*MW)×(h*MH), then w*h processing elements 418 may calculate on the same output tiles, wherein the horizontal and vertical calculation origins may get w and h times farther than in a regular configuration. This requires fewer steps to iterate through an input tile area, both horizontally and vertically. Hence, the apparatus according to the present disclosure may be flexibly adapted to the size of input data and the required convolution operations. Moreover, the apparatus according to embodiments of the present disclosure may be flexibly configured with a particular number of processing elements and/or a number of convolution modules to meet the requirements of the computational task.

The processing illustrated in FIG. 8 may also be characterized as a 2×2 kernel size, single-word horizontal and vertical stride and dilation convolution calculation sequence at a single calculation area origin 801 on an input tile extended with overlapped data. Coefficient data may be selected from weight matrix at respective positions for which the respective input data is accessed from the two-dimensional data buffer, such as the data buffer 431 of FIG. 4, according to respective positions of input windows 807, 809, 811, 813. Positioning of the input window relative to input area origin 801 may correspond to the position of the weight coefficient in the weight matrix according to filter kernel 805, which may result in a full convolution operation with the weight matrix at adjacent input data positions in parallel. Convolution of the full tile is completed by successive calculation sequences at all successive input area origins 804.

The relationship between a position of the weight coefficient in the weight matrix and the size, form, and positioning of the input windows with regard to a size of a resulting output tile may depend on a type of the convolution operation to be performed. According to one or more embodiments, the types of convolution operation may include a convolution mode and a de-convolution mode (transpose to the convolution).

The form, size, and positioning of the input window and its relationship with weight values and the size of the calculated output values may be determined by a set of parameters, including a stride value and a dilation value.

In the convolution mode, the dilation value may determine a distance between two successive positions of the input window. This distance may correspond to a distance between coefficients of the weight matrix when fitted on the input area. A dilation value equal to 1 may define that the weight matrix coefficients are mapped on adjacent data elements. A dilation value equal to 2 may define that the weight matrix coefficients are mapped on each second data element of the input area. The skilled person will understand that dilation values equal to or more than 3 may be defined accordingly.

In convolution mode, the stride value may determine a spacing between data elements sampled by the input window over the input tile. The stride value may define a shape of the input window by setting a spacing between respective data elements sampled in the input area on the input tile. If stride value equals to 1, the input window is formed by adjacent data elements. If the stride value equals to 2, the input window includes every second data element of the input tile. Accordingly, the stride value may determine a ratio between the input tile and a size of the output tile.

The stride value may also be used to determine whether the result store 439 may store results of more than one output area, since for stride values equal to or greater than 2, the size of the resulting output area will be smaller than the size of corresponding input areas.

In one or more embodiments, a corresponding input data buffer, such as the data buffer 431 of FIG. 4, may be configured as a two-dimensional data buffer that may sample an input area according to an input window that may be adjusted using at least the stride value and the dilation value. The input window may be positioned at one or more input area origins, such as input area origins 804 of FIG. 8 to provide access to the input data stored in the data buffer 431. This may simplify retrieval of required input data since data elements need not to be addressed individually and may rather be retrieved according to a parametrized and adjustable input window.

Still referring to FIG. 8, the input window and its positioning may be defined by a stride value of 1 and a dilation value of 1 with regard to a 2×2 filter kernel.

Figure 9:
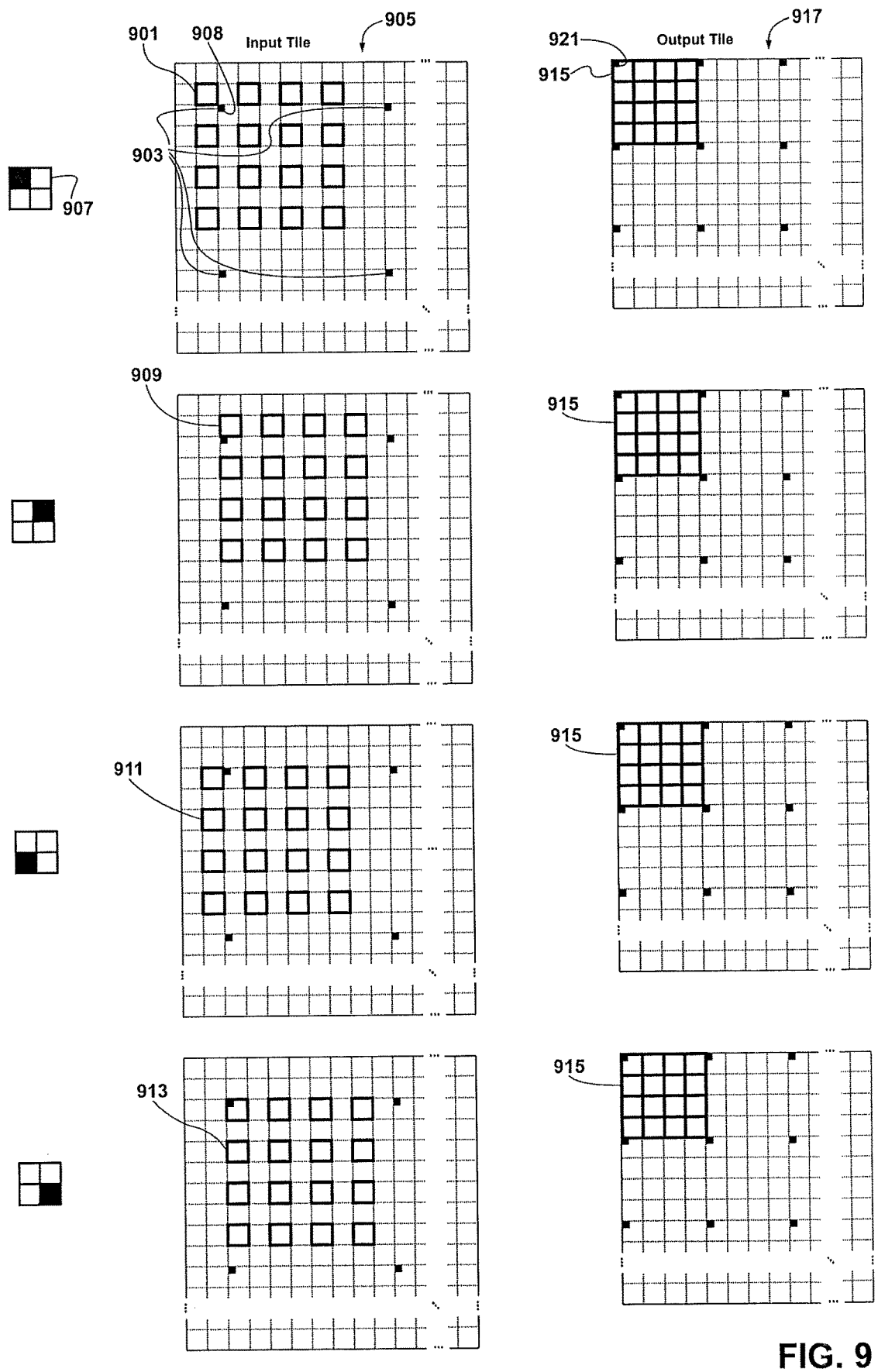
FIG. 9 shows a configuration of an input window for calculating a convolution operation according to one or more embodiments of the present disclosure.

FIG. 9 shows another example of a configuration of an input window 901, which may be positioned at input area origins 903 of an input tile 905 with regard to a filter kernel 907 that may select weight coefficients of a weight matrix. The input window 901 may be defined by a stride value of 2 and a dilation value of 1 with regard to the 2×2 filter kernel 907. The input window 901 is positioned around the origin 908 of the plurality of input area origins 903 resulting in input windows 901, 909, 911, and 913 that are processed with regard to respective weight coefficients of the weight matrix according to filter kernel 907. All data elements of the 4x4 input area sampled by the input windows 901, 909, 911, and 913 contribute to the same output area 915 of an output tile 917.

Accordingly, the configuration shown in FIG. 9 could be characterized as a 2x2 filter kernel, two-word horizontal and vertical strides and single-word dilation convolution calculation sequence at a single calculation area origin 908 of the plurality of origins 903 on the input tile 905, which is extended by overlap data.

Weight coefficients from the weight matrix may be selected at respective positions according to the filter kernel 907 for which input data is sampled by the respective input windows 901, 909, 911, and 913 from a data buffer, such as the data buffer 431 of FIG. 4. In this configuration, every second data element on the input tile 905 is retrieved. Positioning of the input windows 901, 909, 911, and 913 relative to the calculation area origin 908 may correspond to the position of the weight coefficient in the weight matrix, which may result in a full convolution cycle with a weight matrix at two-word spaced positions in parallel. As shown in FIG. 9, the results represent adjacent data elements in the output area 915 at respective output area origin 921 of the output tile 917. Convolution of the full input tile 905 may be completed by successively sampling the input windows at all origins 903, which leads to results for all origins in the output tile 917.

Figure 10:
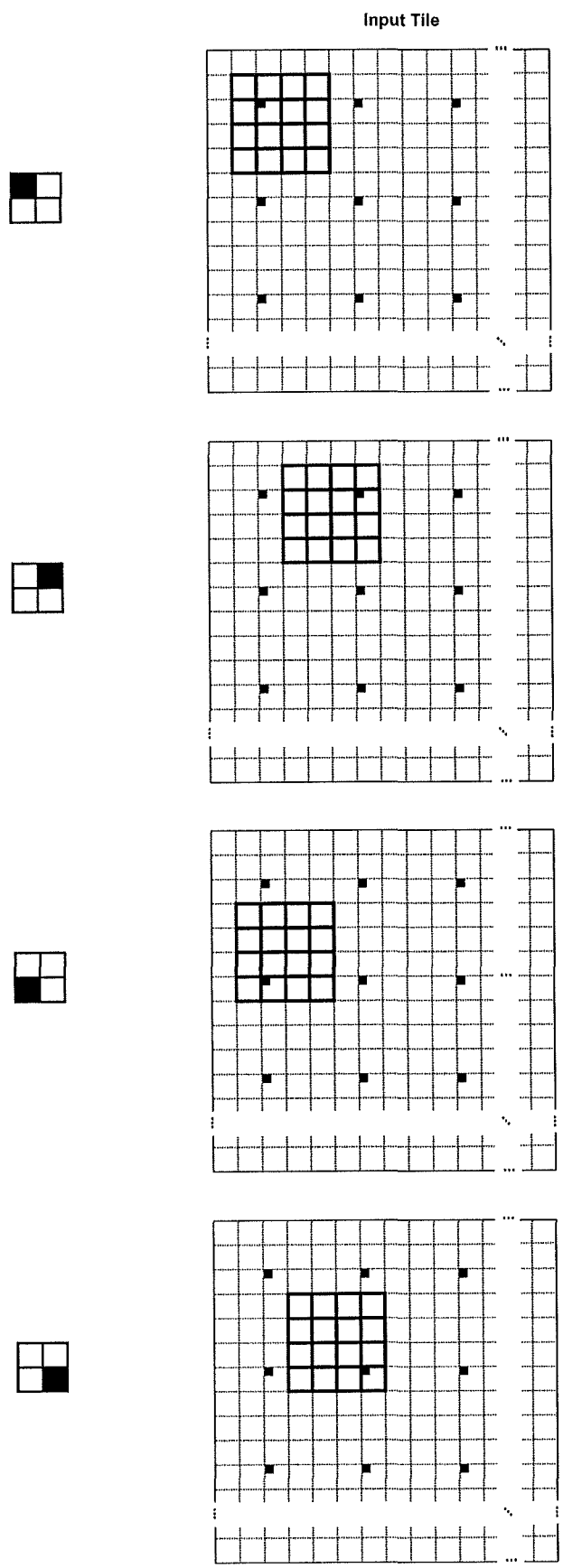
FIG. 10 shows another example of a configuration of an input window for calculating a convolution operation according to one or more embodiments of the present disclosure.

FIG. 10 shows another configuration of the input window and mapping of weight coefficients with a stride value of 1 and a dilation value of 2 with a 2x2 filter kernel. This may be comparable to a 2x2 filter kernel size, single-word horizontal and vertical stride and two-word dilation convolution calculation sequence. Accordingly, the weight matrix is stretched to every second data element from adjacent positions of the input data in parallel.

Figure 11:
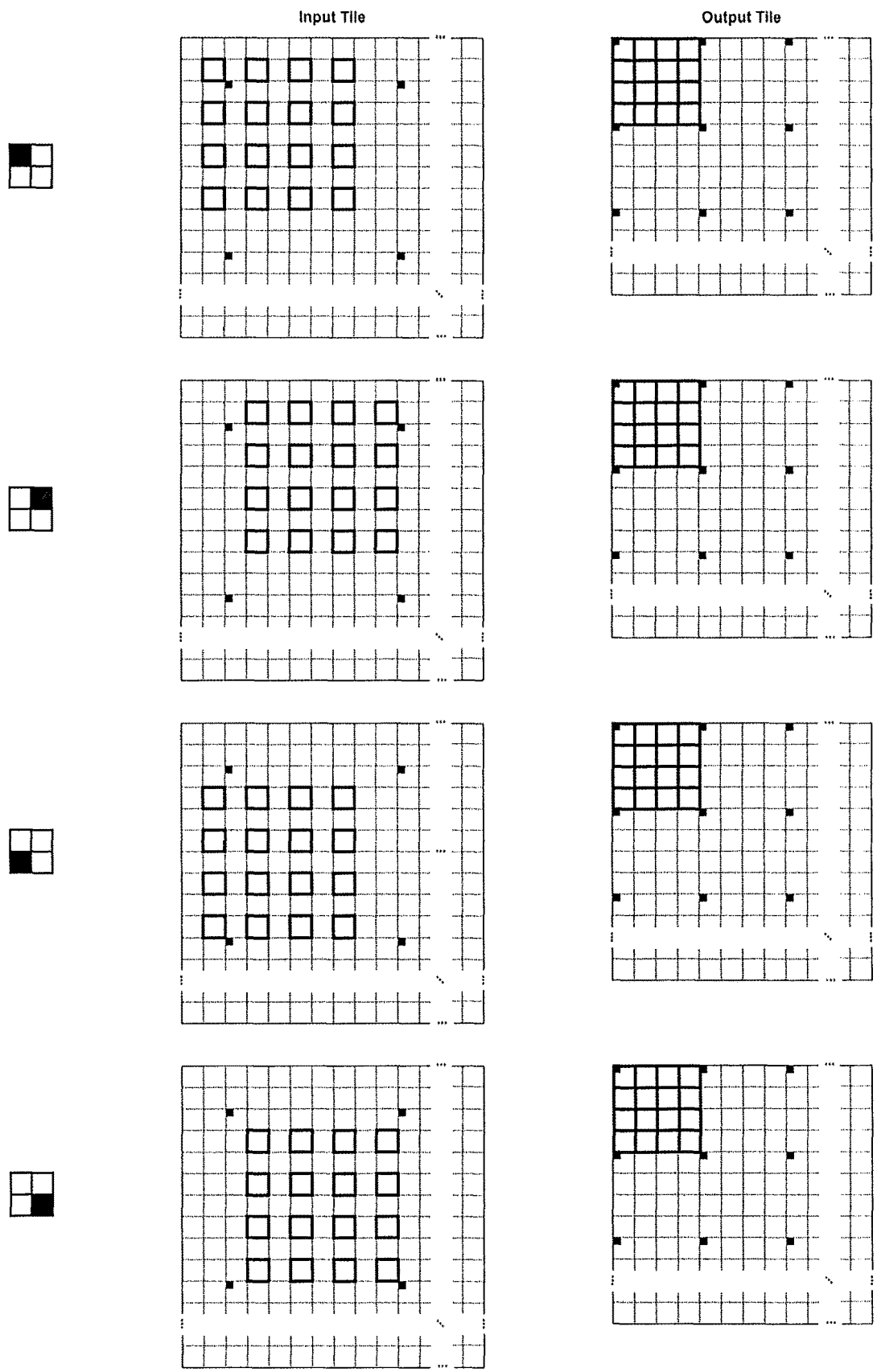
FIG. 11 shows one example of a configuration and positioning of an input window for calculating a convolution operation according to one or more embodiments of the present disclosure.

FIG. 11 shows another configuration of the input window with a stride value of 2 and a dilation value of 2 with a 2x2 filter kernel. This may be comparable to a 2x2 filter kernel size, two-word horizontal and vertical stride, and dilation convolution calculation sequence at a single calculation area origin on an input tile extended with overlap data.

Similar to the configurations discussed with regard to FIGS. 8, 9, and 10, weight coefficients are selected at positions which correspond to positions of corresponding input windows. In the configuration according to FIG. 11, the input window captures every second data element of the input tile starting at an origin and the positioning of the input window relative to the origin corresponds to the position of the weight coefficient in the weight matrix multiplied by 2, which may correspond to a calculation sequence equal to a full convolution cycle with a weight matrix stretched to every second data element from two-word spaced positions in parallel. Partial results are of adjacent data elements at a respective output area origin of the output tile. Full tile convolution is completed by successive calculation sequences at all input calculation origins producing full partial results for all output area origins of the output tile.

In the de-convolution mode, the stride value may determine how many output plane data elements to produce per input plane data element both horizontally and vertically. The stride value may determine a ratio between dimensions of an input tile and an output tile. If the stride value is greater than 1, only a part of the input tile is used to generate the output tile and a single input tile can generate partial results for multiple output tiles of an output plane.

Preferably, for each input plane, data elements are placed over a data area of an output plane with a spacing equal to the stride value both horizontally and vertically, wherein weight matrices may be replicated for each data element of the input plane to be used as weight coefficients per input data element to partial results of the output plane. The number of partial results mapped to a data element of an output plane may have a pattern with a period equal to the stride value both horizontally and vertically.

In the de-convolution mode, a convolution core, such as the convolution core 415 of FIG. 4, may read DW×DH adjacent data words from a data buffer, such as the data buffer 431 of FIG. 4, and produce partial results of a de-convolution operation for an output area of cardinality DW×DH of an output tile with a spacing between data elements equal to the stride value over the output area. Partial results are generated by weight coefficient selection stepping according to the stride value horizontally and vertically inside the weight matrix.

Figure 12:
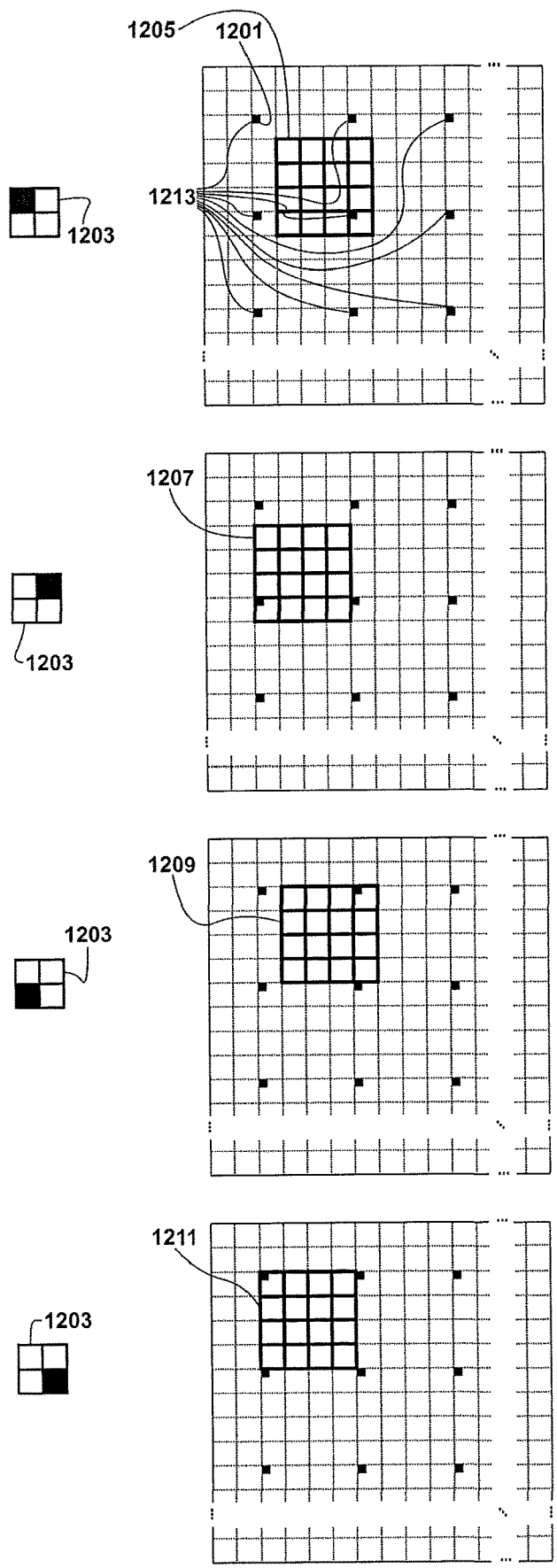
FIG. 12 shows an example of positioning an input window for calculating a de-convolution operation according to one or more embodiments of the present disclosure.

FIG. 12 shows positioning of an input window for a de-convolution sequence around a single input area origin with a stride value of 1 and a dilation value of 1 with a 2x2 filter kernel. An input window may be positioned with respect to an input area origin 1201 of a plurality of input area origins 1213 of an input tile according to a filter kernel 1203. For input area origin 1201, this may result in input windows 1205, 1207, 1209, and 1211.

During de-convolution, the selection of weight coefficients from the weight matrix according to filter kernel 1203 may be an inverse to the position of the input windows 1205, 1207, 1209, and 1211 with respect to the input area origin 1201.

The configuration as shown in FIG. 12 may be understood as a 2x2 filter kernel, single-word horizontal and vertical stride and dilation de-convolution calculation sequence at a single calculation area origin 1201 on an input tile extended with overlap data. Coefficients are selected from the weight matrix according to positions of the input windows 1205, 1207, 1209, and 1211. Positioning of the input windows 1205, 1207, 1209, 1211 relative to the input area origin 1201 may be the inverse of an actual weight coefficient position in the weight matrix according to filter kernel 1203. This may result in a calculation sequence equal to a full de-convolution cycle with a weight matrix at adjacent positions in parallel. A full de-convolution of the tile is completed by successive calculation sequences at all calculation area origins 1213 of the input tile.

Figure 13A:
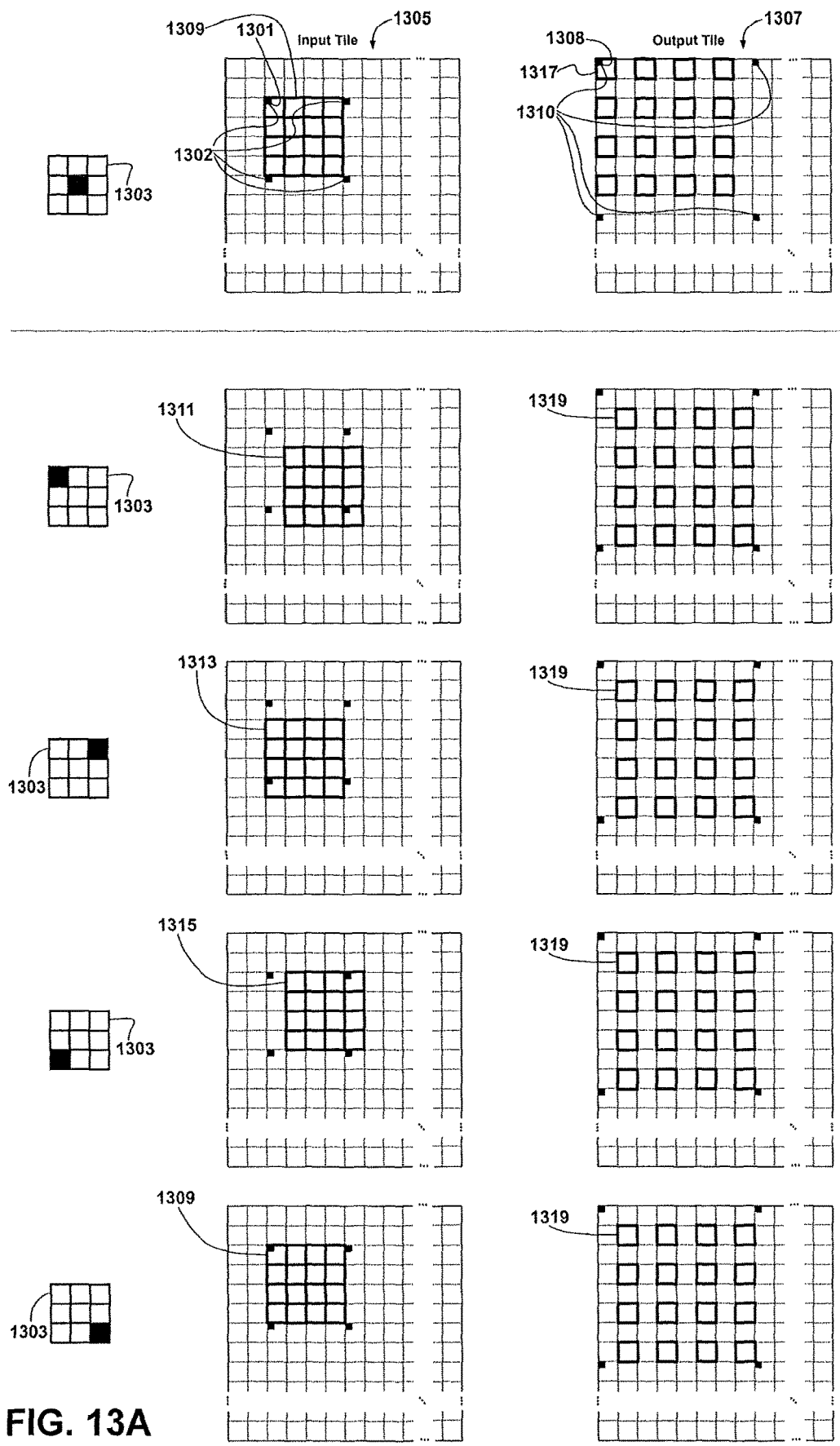
FIGS. 13A and 13B show another example of a configuration for calculating a de-convolution operation according to one or more embodiments of the present disclosure.
Figure 13B:
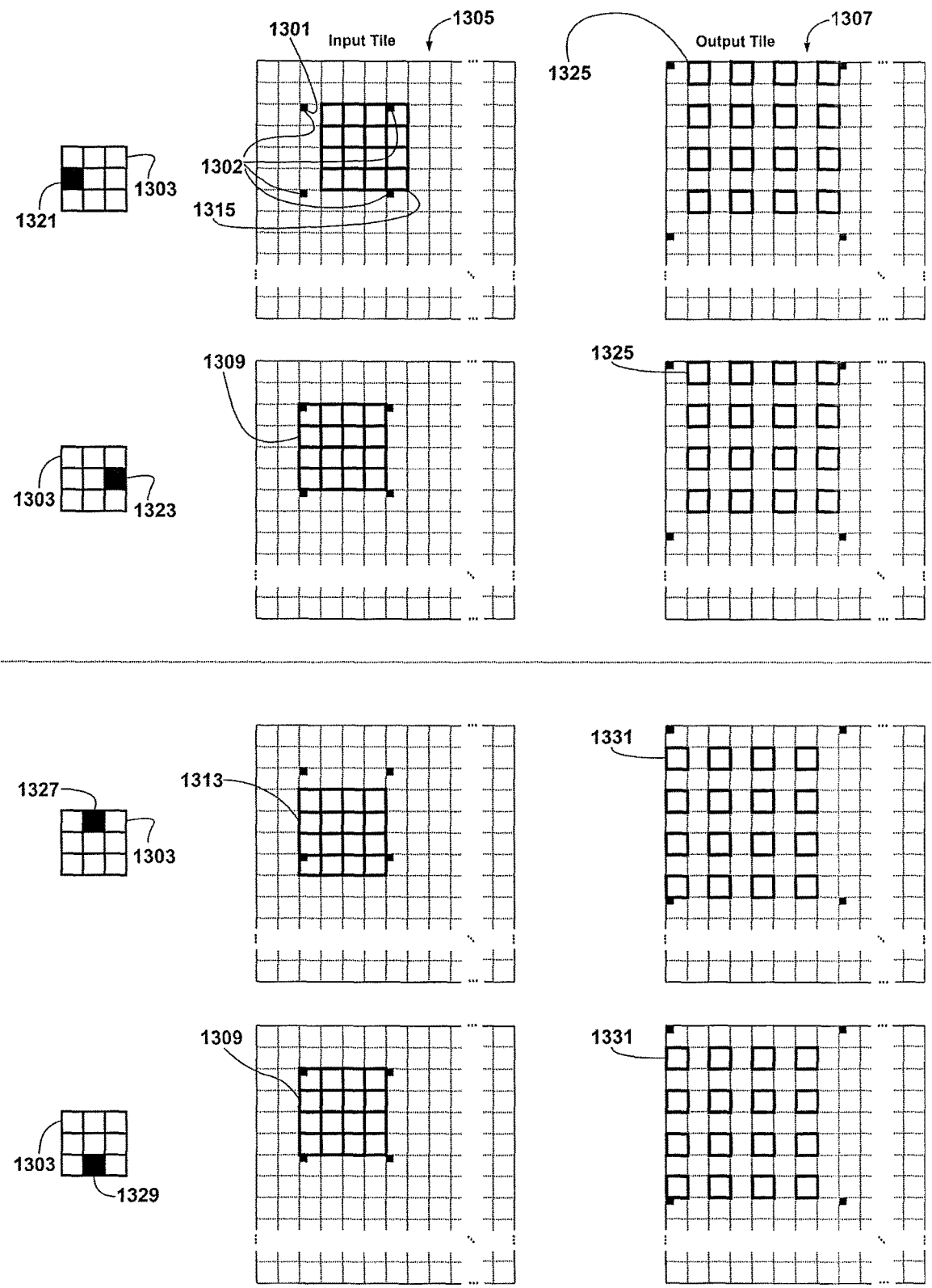

FIGS. 13A and 13B show another configuration of the input window to sample data elements of an input tile and results for an output tile for a de-convolution sequence around a single input area origin 1301 of a plurality of input area origins 1302 for a stride value of 2, a dilation value of 1 and 3x3 filter kernel 1303. FIGS. 13A and 13B show positioning of an input window on an input tile 1305 and corresponding results for an output tile 1307. The configuration showed in FIGS. 13A and 13B may be understood as a 3x3 filter kernel, two-word horizontal and vertical stride and single-word dilation de-convolution calculation sequence generating an output area at an output area origin 1308 of a plurality of output area origins 1310, wherein the output area is stride-times larger both horizontally and vertically, from input data around a single calculation area origin 1301 on the input tile 1305 extended with overlap data. Calculations at each of the plurality of input area origins 1302 may generate results at corresponding output area origins 1310.

Positioning of the input window may result in input windows 1309, 1311, 1313, and 1315.

As shown in the first line of FIG. 13A, a combination of a weight coefficient as mapped by a central value of the filter kernel 1303 with the input window 1309, generates partial results for stride-spaced locations of an output area 1317 on the output tile 1307. The term stride-spaced locations as used throughout this description refers to locations on an area that are spaced apart horizontally and/or vertically according to a stride value.

The input windows 1311, 1313, 1315, 1309 and respective weight coefficients from the weight matrix as selected by filter kernel 1303 may lead to partial results for stride-spaced locations of an output area 1319 on the output tile 1307 that have a single-word location offset to the locations of the output area 1317 on the output tile 1307.

FIG. 13B shows other combinations of input windows 1309 and 1313, as well as 1309 and 1315 with different weight coefficients of the weight matrix according to filter kernel 1303 which are used to calculate other data elements of the output tile 1307.

A combination of the input window 1315 with weight coefficient 1321 and a combination of input window 1309 with weight coefficient 1323 defines partial results for stride-spaced locations of output area 1325 on the output tile 1307 that have a single-word horizontal offset to and matching vertical locations with locations of the output area 1317 on the output tile 1307. The combination of input window 1313 with weight coefficient 1327 and input window 1309 with weight coefficient 1329 define partial results for stride-spaced locations of output area 1331 on the output tile 1307 that have a single-word vertical offset to and matching horizontal locations with locations of the output area 1317 on the output tile 1307.

As detailed with regard to FIGS. 13A and 13B, positioning of the input window relative to the input area origin 1301 may correspond to an actual position of a weight coefficient in the weight matrix divided by the negative stride value, in this example −2. This may result in a calculation sequence equal to a full de-convolution cycle with a weight matrix during which partial results by DW×DH input window 1309, 1311, 1313, 1315 propagate values to each one of stride-spaced locations both horizontally and vertically, with varying location offsets per cycle, effectively resulting in a generated area of size (stride*DW)×(stride*DH) from an input area of size DW×DH. The location offsets of partial results propagation patterns corresponding to output areas 1317, 1319, 1325, 1331 relative to the output area origin 1308 may correspond to the actual position of the weight coefficient in the weight matrix.

The configuration of FIGS. 13A and 13B enables a full tile de-convolution by successive calculation sequences at all input area origins 1302 for all positions of the input windows 1309, 1311, 1313, and 1315 and their combinations with respective weight coefficients of the weight matrix according to the filter kernel 1303.

Figure 14:
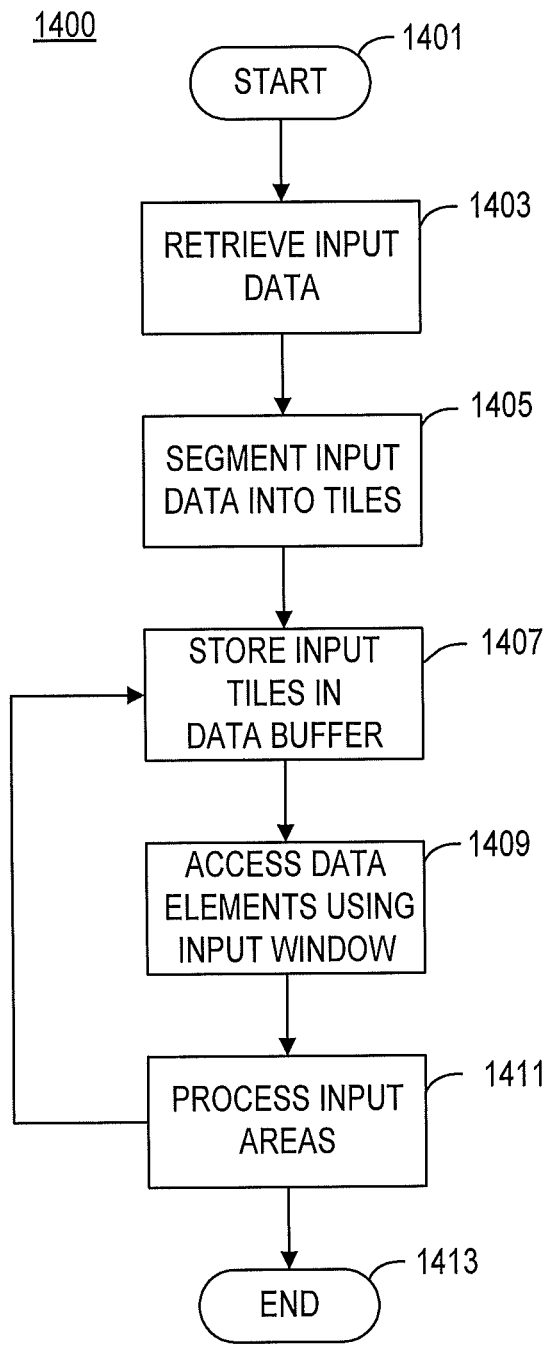
FIG. 14 shows a flow chart of a method according to one embodiment of the present disclosure.

FIG. 14 shows a flow chart of a method for accessing and processing a layer of data by an accelerator apparatus according to one embodiment of the present disclosure. The method may be implemented on an accelerator apparatus, such as apparatus 401 shown in FIG. 4.

The method 1400 may start in item 1401 and proceed with item 1403, where at least a part of input data to be processed by the accelerator apparatus is retrieved. The input data may be segmented or partitioned into a plurality of adjacent input tiles in item 1405. The input tiles may have a pre-determined size. Subsequently, at least one of the plurality of adjacent input tiles may be stored in a data buffer of the accelerator apparatus in item 1407.

In item 1409, the data elements of the at least one of the plurality of adjacent input tiles stored in the data buffer may be accessed by positioning an input window over the data elements stored in the data buffer, to generate a plurality of input areas, wherein the input window is adjustable according to a set of parameters. The set of parameters may include a stride value and a dilation value, which may define a configuration and positioning of the input window on an input area with regard to a position of coefficient values, and their contribution to output data elements. Examples of configurations of input windows have been described with regard to embodiments of FIGS. 8 to 13.

In item 1411, at least one of the plurality of input areas may be sequentially processed to at least partially process the at least one of the plurality of adjacent input tiles by the accelerator apparatus.

The method 1401 may repeat by storing another one of the plurality of adjacent input tiles in the data buffer in item 1407, and accessing data of the other one of the plurality of adjacent input tiles using the input window in item 1409. This may be repeated sequentially or in parallel until computation on the entire input data completes.

The method 1400 may end in item 1413.

Embodiments of the present disclosure are applicable in various technological areas, including computer vision, such as face and object detection, traffic monitoring and automated driving, as well as in any other area requiring performance of a huge number of mathematical operations in order to provide information enabling computer-guided or automated decision making for an automated control of devices. However, it is to be understood that the present disclosure is not limited to a particular configuration of the input data and/or an application area, but rather may define technical method steps and a technical setup of a processing apparatus enabling complex computations on sensor, state or configuration data in order to derive information suitable for controlling devices.

While some embodiments have been described in detail it is to be understood that aspects of the disclosure can take many forms. In particular, the claimed subject matter may be practiced or implemented differently from the examples described and the described features and characteristics may be practiced or implemented in any combination. The embodiments shown herein are intended to illustrate rather than to limit the invention as defined by the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for accessing and processing data by an accelerator apparatus, comprising:
retrieving at least a part of input data to be processed by the accelerator apparatus;
segmenting the input data into a plurality of adjacent input tiles, the input tiles having a pre-determined size;
storing at least one of the plurality of adjacent input tiles in a data buffer of the accelerator apparatus;
accessing data elements of the at least one of the plurality of adjacent input tiles stored in the data buffer by positioning an input window over the data elements stored in the data buffer, to generate a plurality of input areas, wherein the input window is adjustable according to a set of parameters including a stride value and a dilation value, wherein the dilation value defines a distance between two successive positions of the input window; and
sequentially processing at least one of the plurality of input areas to at least partially process the at least one of the plurality of adjacent input tiles by the accelerator apparatus.

2. The method of claim 1, further comprising sequentially storing another one of the plurality of adjacent input tiles in the data buffer, and accessing data of the other one of the plurality of adjacent input tiles using the input window.

3. The method of claim 1, further comprising determining a processing mode of the accelerator apparatus, wherein, in a first processing mode, the stride value defines a spacing between data elements sampled by the input window, and wherein, in a second processing mode, the stride value defines a number of data elements generated by a single data element of the input window.

4. The method of claim 1, wherein the set of parameters further includes a mapping to a coefficient matrix stored in a coefficient buffer, wherein an input area is processed by applying at least one element of the coefficient matrix to the input area according to the mapping.

5. The method of claim 4, further comprising:
retrieving the at least one element of the coefficient matrix from the coefficient buffer, wherein the at least one element of the coefficient matrix is retrieved in parallel with generating the input area, and
applying the at least one element of the coefficient matrix on the input area using at least one processing element.

6. The method of claim 1, wherein via the input window, the data elements are accessed using hard-wired circuitry implementing the data buffer.

7. The method of claim 1, wherein the data buffer is a two-dimensional data buffer and each of the plurality of input areas represents a two-dimensional area.

8. The method of claim 1, wherein the accelerator apparatus implements a convolution operation on the input data and wherein the input data represent data elements of a layer of a neural network.

9. The method of claim 1, wherein the input data include sensor data.

10. An accelerator apparatus for processing input data, comprising:
an interface configured to couple the apparatus to an interconnect; and
at least one processing module configured to process input data, wherein the accelerator apparatus is configured to retrieve at least some of the input data via the interface and process the input data using the at least one processing module according to claim 1.

11. The accelerator apparatus of claim 10, wherein the apparatus is configured to retrieve input data via the interface, the input data representing at least a part of an input layer of a neural network, wherein the at least one processing module processes at least a part of a layer of the neural network.

12. The accelerator apparatus of claim 10, further comprising a cache module configured to store at least a portion of data processed by the at least one processing module, wherein data stored in the cache module represent at least a part of a next layer of the neural network.

13. The accelerator apparatus of claim 10, wherein the accelerator apparatus is a convolutional neural network accelerator.

14. A system comprising:
a processing host;
at least one memory;
an accelerator apparatus according to claim 10; and
an interconnect coupling the processing host, the at least one memory, and the accelerator apparatus, wherein the accelerator apparatus is configured to retrieve input data from the at least one memory via the interconnect.

* * * * *